United States Patent [19]

Minato et al.

[11] Patent Number: 5,719,653
[45] Date of Patent: Feb. 17, 1998

[54] LIQUID CRYSTAL PANEL INCLUDING ANTIFERROELECTRIC LIQUID CRYSTAL AND PROCESS FOR PRODUCING THE SAME

[75] Inventors: Takao Minato; Katsuhiro Suzuki, both of Tokyo; Hideo Hama; Yukari Sakai, both of Sodegaura, all of Japan

[73] Assignees: Toppan Printing Co., Ltd.; Mitsui Petrochemical Industries, Ltd., both of Tokyo, Japan

[21] Appl. No.: 590,579

[22] Filed: Jan. 24, 1996

[30] Foreign Application Priority Data

Jan. 24, 1995 [JP] Japan ................................. 7-027593

[51] Int. Cl.⁶ .................. G02F 1/1337; G02F 1/141; G02F 1/1339; G02F 1/13
[52] U.S. Cl. .................. 349/156; 349/126; 349/133; 349/174
[58] Field of Search ................. 359/56, 81, 78; 349/171, 155, 156, 123, 126, 133, 174

[56] References Cited

U.S. PATENT DOCUMENTS

| | | | |
|---|---|---|---|
| 4,367,924 | 1/1983 | Clark et al. | 349/171 |
| 4,720,173 | 1/1988 | Okada et al. | 349/155 |
| 5,214,523 | 5/1993 | Nito et al. | 349/132 |
| 5,367,391 | 11/1994 | Johno et al. | 349/171 |
| 5,473,449 | 12/1995 | Takemura et al. | 349/171 |
| 5,490,001 | 2/1996 | Konuma et al. | 349/171 |
| 5,559,621 | 9/1996 | Minato et al. | 349/155 |

OTHER PUBLICATIONS

"Structure of Ferroelectric Liquid Crystal and Properties Thereof", Fukuda and Takezoe, published by Corona Publishing Co., Ltd. in 1990, pp. 15–19, pp. 345–349.
"Future Liquid Crystal Display and Its Materials" Fukuda, Published by CMC Co., in 1992, pp. 1–13, pp. 102–113.
"High Resolution, Large Area, FLC Display With High Graphic Performance", Kanbe, et al., Ferroelectrics, 1991, vol. 114, pp. 3–26.

*Primary Examiner*—William L. Sikes
*Assistant Examiner*—Toan Ton

[57] ABSTRACT

Striped electrodes are formed on upper and lower substrates respectively, and a plurality of partition members are formed in a striped fashion so that a plurality of parallel sealed linear interstices R, each having a rectangular section, are formed between the substrates. A upper-side rubbing direction crosses a lower-side rubbing direction at a predetermined angle, and the direction of extension of each of the partition members is caused to fall within the above cross angle. An antiferroelectric liquid crystal is sealed in the linear interstices, and the liquid crystal panel is cooled while proceeding from one end of the linear interstices to the other end thereof. The layer normal direction of liquid crystal molecular layer becoming irregular between the upper and lower substrates is prevented by the employment of the cross rubbing method to thereby avoid the occurrence of defects in the liquid crystal. Further, the occurrence of zigzag defects is prevented by controlling the infiltration of the antiferroelectric liquid crystal and also controlling the cooling.

8 Claims, 12 Drawing Sheets

Fig. 1(a)
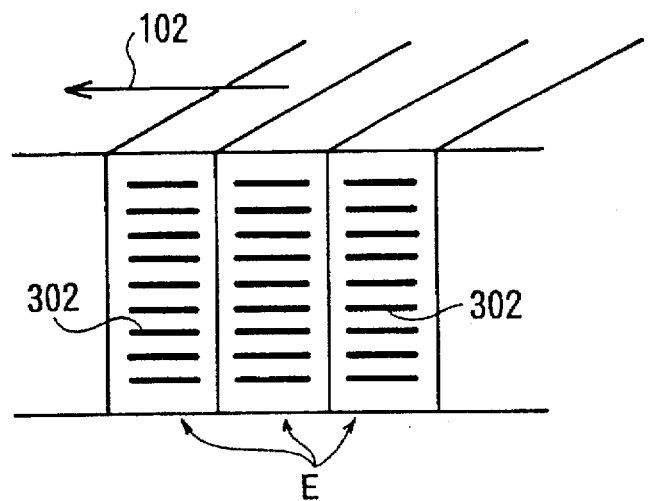
Fig. 1(b)　Fig. 1(c)　Fig. 1(d)
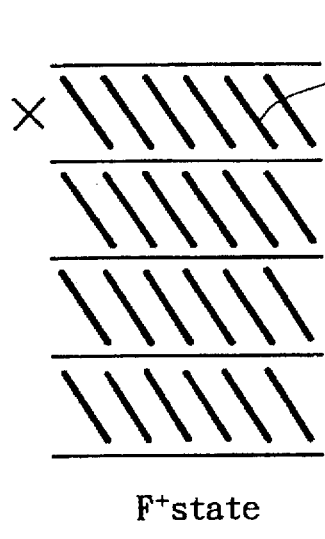
F⁺ state
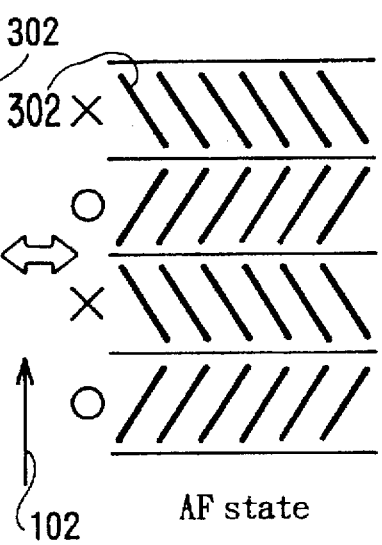
AF state
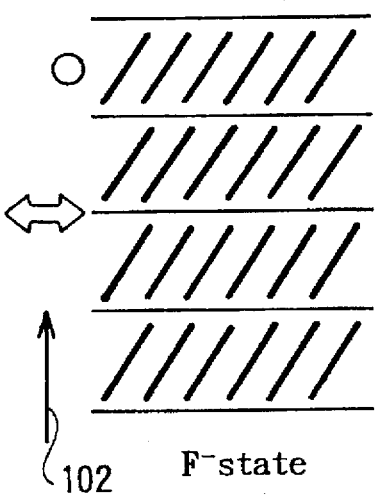
F⁻ state

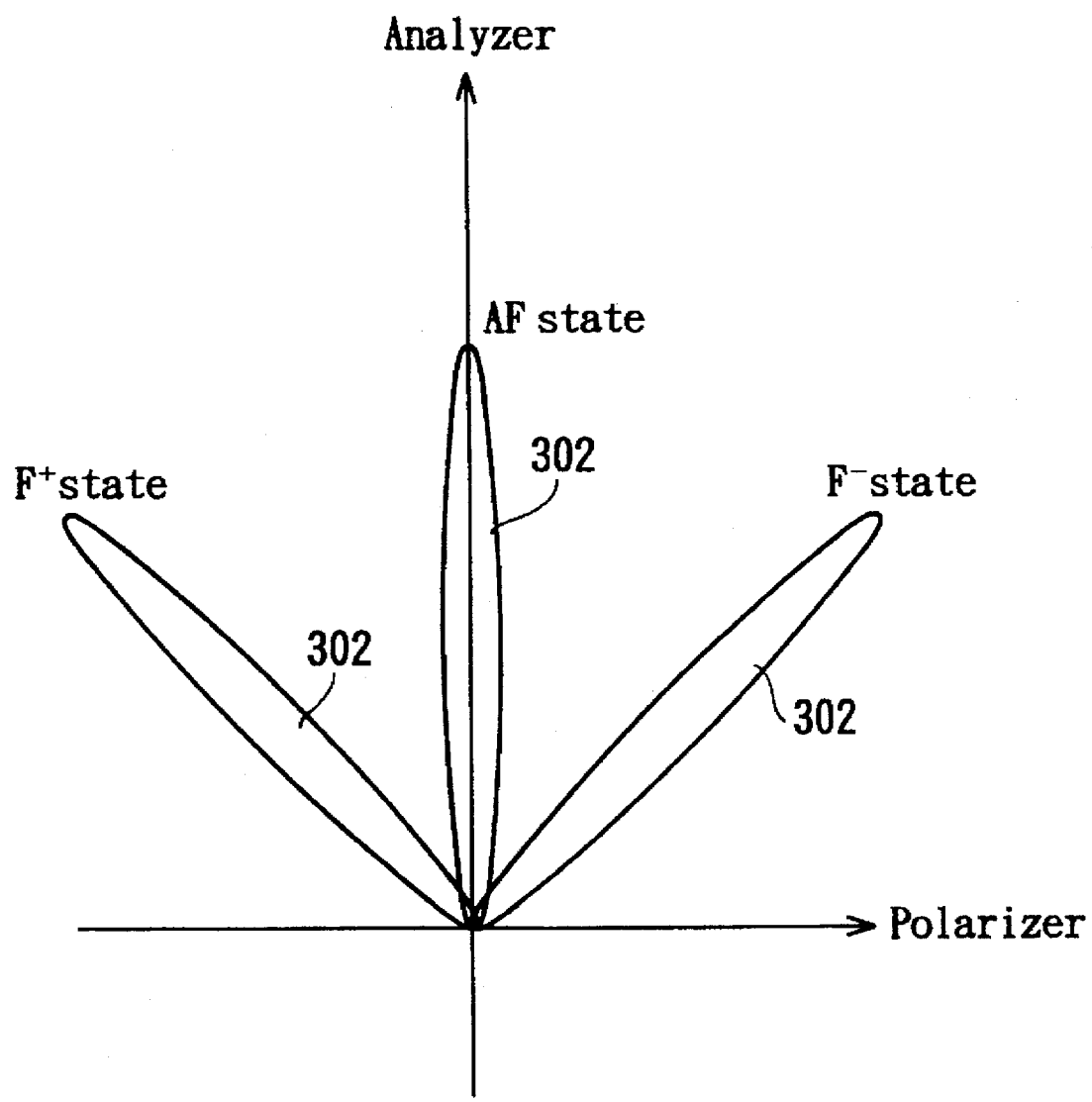

C1 state

C2 state

C1/C2 hybrid

One-side C2 state

One-side C1 state

C1 state

C2 state

Fig. 14(a)
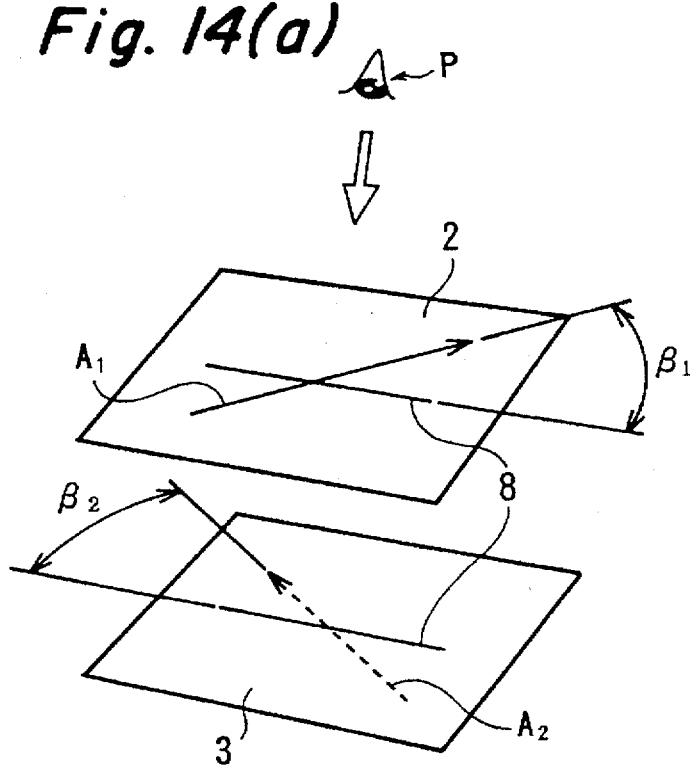
Fig. 14(b)
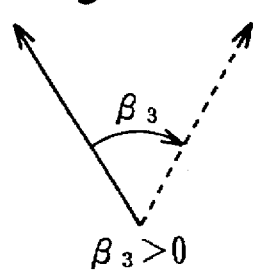
$\beta_3 > 0$
Fig. 14(c)
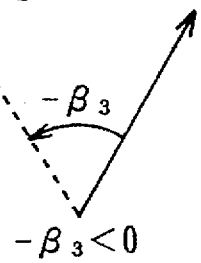
$-\beta_3 < 0$
Fig. 14(d)
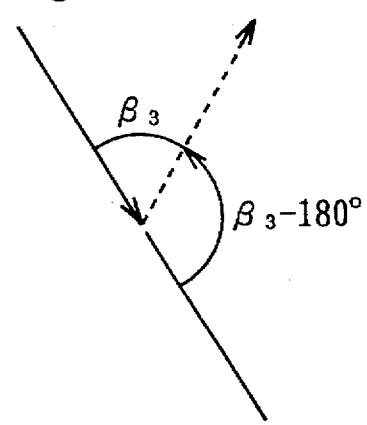
Fig. 14(e)

LIQUID CRYSTAL PANEL INCLUDING ANTIFERROELECTRIC LIQUID CRYSTAL AND PROCESS FOR PRODUCING THE SAME

FIELD OF THE INVENTION

The present invention relates to a liquid crystal panel as a principal constituent member of a liquid crystal display for industrial, office automation and domestic applications. Particularly, the present invention relates to a liquid crystal panel including an antiferroelectric liquid crystal sealed therein. More particularly, the present invention is concerned with a method of controlling the alignment (orientation) of the antiferroelectric liquid crystal.

BACKGROUND OF THE INVENTION

In recent years, a liquid crystal display has become widely used as a display unit for computers and other equipment. The principal constituent member of the liquid crystal display is a liquid crystal panel frame composed of a pair of glass substrates and a liquid crystal panel formed by infiltrating a liquid crystal into the frame. For example, a striped transparent electrode is formed on each glass substrate, and, according to necessity, an insulating coating and an organic thin coating of polyimide, polyvinyl alcohol or the like or an inorganic thin coating of silicon oxide or the like are laminated in that order to the above transparent substrate.

In the color display, a color filter is formed under the transparent electrode or, occasionally, thereon. The above organic thin coating is provided with uniaxial alignment treatment, for example, rubbing treatment so as to possess uniaxial alignment properties relative to the liquid crystal. The above silicon oxide is vapor deposited so as to possess uniaxial alignment properties.

With respect to the liquid crystal panel frame, the pair of glass substrates are bonded together so as for the pair of striped transparent electrodes to face each other at right angles. In the frame, a vast plurality of gap supports known as spacers are interposed between the substrates, thereby maintaining the gap between the substrates at a predetermined minute value. The liquid crystal display is generally produced by sealing a liquid crystal in the above liquid crystal panel frame to thereby obtain a liquid crystal panel, performing alignment treatment, mounting accessories such as a polarizing plate, driving IC and a back-light on the panel and accommodating the resultant assembly in a cabinet.

In recent years, the practical use of, especially, a liquid crystal display in which a ferroelectric liquid crystal or an antiferroelectric liquid crystal is employed is being studied. For example, such studies are disclosed in the following literature:

(1) "Structure of Ferroelectric Liquid Crystal and Properties Thereof" written by Fukuda and Takezoe and published by Corona Publishing Co., Ltd. in 1990; and (2) "Future Liquid Crystal Display and Its Materials" edited by Fukuda and published by CMC Co., Ltd. in 1992. These studies are conducted in the anticipation that the above liquid crystal has a so-called memory effect and high-speed response characteristic, so that a highly fine large-capacity display of high image quality can be executed by simple matrix drive not requiring active elements such as a thin film transistor (TFT) and a metal insulator metal diode (MIM). The above high-speed response characteristic generally means capability of responding within about tens of microseconds.

In accordance with the cooling from a high temperature at which the liquid crystal is in the state of liquid phase Iso (i.e., isotropic phase), the above liquid crystal exhibits a variety of complex phase changes, for example, chiral nematic (N*) phase→smectic A (SmA) phase→chiral smectic C (SmC*) phase→chiral smectic $C_A$ ($SmC_A$*). In this connection, all the phases mentioned above do not always appear in each phase change depending on the type of the liquid crystal. For example, the N* phase suitable for effecting an alignment has not been found in the antiferroelectric liquid crystal.

The chiral smectic phase is positioned on the low temperature side as compared with the nematic phase, has low symmetry and is in the state of being close to a crystal. Specifically, the chiral smectic phase is chiral smectic C phase (including F, H and I phases) in the case of a ferroelectric liquid crystal and is chiral smectic $C_A$ phase (including sub phases such as Cα, Cβ and Cγ phases) in the case of an antiferroelectric liquid crystal.

The above chiral smectic phase has a layer structure as shown in FIG. 1. Specifically, FIG. 1(a) is a perspective sectional view of the layer structure, and FIGS. 1(b) to (d) are front views. The liquid crystal molecules 302 of each layer can tilt in either of right and left directions. The state in which all the molecules tilt left is represented by F⁺ (FIG. 1(b)) and the state in which all the molecules tilt right is represented by F⁻ (FIG. 1(d)). Each liquid crystal molecule 302 has spontaneous polarization in the direction perpendicular to the molecular axis, which direction is perpendicular to the sheet face. In the F⁺ state, the direction of spontaneous polarization is downward from the sheet face, which is represented by "x". On the other hand, in the F⁻ state, the direction of spontaneous polarization is upward from the sheet face, which is represented by "o". The two phases, i.e., F⁺ state and F³¹ state can be switched from each other at a rate on the order of microsecond by changing the polarity of the direct current electric field (DC) between positive and negative. Further, in the antiferroelectric liquid crystal, there is an antiferroelectric state (AF state, FIG. 1(c)) in which the F⁺ state and F⁻ state layers alternate with each other besides the above F⁺ state and F⁻ state. The AF state is the most stable.

Therefore, the antiferroelectric liquid crystal is more advantageous than the ferroelectric liquid crystal in providing a display. The reason is that, in the AF state, the direction of liquid crystal molecules, i.e., the direction of spontaneous polarization is changed every layer, so that spontaneous polarization components as a whole are zero to give the stable state. With respect to the AF state, the spontaneous polarization directions of all of the liquid crystal molecule layers are in conformity derived into the F⁺ state or F⁻ state by controlling the polarity of the direct current electric field. Further, there is a definite threshold value of direct current voltage between the AF state and the F⁺ state and between the AF state and the F⁻ state. Thus, a display technology has been developed in which the F⁺ state and the F⁻ state can each be held as one ON (light) state by application of direct current bias voltage in the optical arrangement of FIG. 2 while the AF state is used as an OFF state (dark) by application of weak direct current voltage (see, for example, page 102 of "Future Liquid Crystal Display and Its Materials" edited by Fukuda and published by CMC Co., Ltd. in 1992). Therefore, in the antiferroelectric liquid crystal, no memory effect is needed in the F⁺ state and the F⁻ state and the material used therefor is not limited. The display including the above antiferroelectric liquid crystal has the feature of being wide in the angle of visibility, which is not possessed by other displays.

Generally, in the ferroelectric liquid crystal, the $F^+$ state and the $F^-$ state which are derived by application of direct current voltage cannot, however, be retained. Thus, the memory effect ensuring maintenance thereof after formation is inevitable. However, with respect to the ferroelectric liquid crystal, only either the $F^+$ state or the $F^-$ state is stable in most materials because of the interaction between the spontaneous polarizations and an alignment coating. This causes the problem that the range of the suitable liquid crystal materials and alignment coating materials is limited.

Another advantage of the antiferroelectric liquid crystal resides in capability of obtaining gradation. That is, only two states can be realized in the ferroelectric liquid crystal by application of direct current voltage, so that the possibility of gradation development is low. However, the possibility of analogous gradation development has been pointed out with respect to the antiferroelectric liquid crystal. This is because there is the possibility of regulation of the ratio of the $F^+$ state to the $F^-$ state by the energy applied to the antiferroelectric liquid crystal.

It has been pointed out as still another advantage of the antiferroelectric liquid crystal that the antiferroelectric liquid crystal has a layer structure itself ensuring relatively high antishock and impact resisting properties and also has self-repairing capability, although the ferroelectric liquid crystal has a layer structure which is likely to be broken by impact.

On the other hand, the chiral smectic phase interposed between the electrodes of the liquid crystal panel must be of a single crystal phase free from alignment defects peculiar to crystal, i.e., a monodomain phase. The presence of defects would deteriorate the image quality and provide a hotbed for the occurrence of new defects at the time of driving. In this respect, the antiferroelectric liquid crystal aligned by the use of the conventional alignment treatment is gravely disadvantageous as compared with the ferroelectric liquid crystal. The reason is that only the process comprising infiltrating the antiferroelectric liquid crystal in a liquid crystal panel frame having a single connected internal space which has been provided with uniaxial alignment treatment and cooling from a high temperature at which the antiferroelectric liquid crystal is in a liquid state causes the occurrence in the layer of the chiral smectic phase of a number of miscellaneous defects which are not encountered in the use of the ferroelectric liquid crystal.

These defects occur in relation to the domanial precipitation of the SmA phase from the liquid phase. For example, stringy defects being the vestiges of the association of SmA phase domains, diamondlike defects being parts resulting from filling of holes which remain after collision of a plurality of domains and phenomenon of dimming of extinction direction inside domain appear. Further, there are defects developed after the transition to the chiral smectic phase. Therefore, visually, linear and diamondlike defects appear in a large amount. When a display is fabricated with the use of the liquid crystal having these defects, the entire extinction directions are not fixed in a single direction and a large amount of light leaks through these defects. Thus, the problem occurs that the absolute transmission factor of light in the AF state is high and the contrast is low. Naturally, the quality of display in the $F^+$ state and the $F^-$ state is deteriorated. One reason for the occurrence of these phenomena is that the antiferroelectric liquid crystal has not the N* phase, so that a direct phase transition occurs from the random liquid phase to the SmA phase of layer structure— with the result that the direction of the layer of the smectic phase is hard to fix.

In this respect, Japanese Patent Laid-open Publication No. 6(1994)-3676 describes that the employment of a cross rubbing in which the rubbing directions of the upper and lower alignment coating are not arranged in parallel but crossed at an appropriate angle reduces miscellaneous defects and improves the alignment. The inventor's experiments confirmed this effect. The reason for the exertion of this effect would be that, with respect to the liquid crystal exhibiting antiferroelectricity, the layer normal direction of the SmA phase often extensively deviates from the direction of the uniaxial alignment treatment.

For example, it occurs that, as shown in FIG. 3, the layer normal L1 of the liquid crystal molecular layer E tilts at an angle of $\beta1$ from the rubbing direction A at the upper substrate 301a of a pair of substrates 301a, 301b between which the antiferroelectric liquid crystal is interposed, while the layer normal L2 tilts at an angle of $\beta2$ in the opposite direction at the lower substrate 301b. When the alignment coatings of the upper and lower substrates are composed of the same material, generally, $\beta1=\beta2$. Therefore, it would result that the layer normal of the liquid crystal molecular layer E is twisted in the direction of cell gap G and that the layer normal direction differs at each of manifold points in the direction of cell gap G. Accordingly, cooling of the liquid crystal panel frame filled with the liquid crystal leads to the occurrence at manifold points of various domains which are different from each other in the internal structure and orientation. The domains collide with each other. When the conformability between the domains put into collision is poor, the parts of association thereof would become defects.

In this situation, if the rubbing directions of the upper and lower substrates 301a, 301bare crossed, i.e., a cross rubbing is effected as shown in FIG. 3 and if the cross angle is regulated to, for example, $\beta1+\beta2$, the layer normal L1 of the liquid crystal molecular layer at the upper substrate 301a would agree with the layer normal L2 of the liquid crystal molecular layer at the lower substrate 301b. The consistency of domain association parts is enhanced in accordance with the agreement of the layer normal direction of the liquid crystal molecular layer of the SmA phase inside each domain and between the domains with the result that a relative reduction of miscellaneous defects is attained, thereby enabling obtaining SmA and chiral smectic phases of high quality. Further, a clear extinction direction is present within the cross angle of $\beta1+\beta2$, so that a high shade contrast can be obtained.

However, as the cross rubbing angle is optimized to thereby reduce miscellaneous defects, that is, as the layer structure of the smectic phase is rendered perfect, quasilinear defects and zigzag defects being alignment defects peculiar to this layer are actualized. That is, the cross rubbing prepares an environment for the development to a visually confirmable state of defects of the kind radically different from the miscellaneous defects attributed to, for example, the twist of the layer normal of the liquid crystal molecular layer between the upper and lower substrates. These alignment defects such as zigzag defects are well known as alignment abnormality observed in the ferroelectric liquid crystal whose layer structure is in a complete condition and have been the biggest obstacles to the practical use.

OBJECT OF THE INVENTION

The present invention has been made with a view toward solving the above problems.

Specifically, an object of the present invention is to provide a liquid crystal panel including an antiferroelectric liquid crystal, in which the occurrence of twist and irregularity in the layer normal direction of the liquid crystal molecular layer is prevented between a pair of substrates having the antiferroelectric liquid crystal interposed therebetween to thereby avoid the occurrence of miscellaneous alignment defects in the liquid crystal.

Another object of the present invention is to provide a liquid crystal panel structured so as to securely prevent the occurrence of quasi-linear defects and zigzag defects actualized due to the inadequacies in the method of filling the antiferroelectric liquid crystal and in the cooling method in the absence of the miscellaneous alignment defects attributed to the twist, irregularity and the like in the layer normal direction.

Still another object of the present invention is to provide a process for producing a liquid crystal panel, which process is the most suitable for the above structure.

A further object of the present invention is to provide a liquid crystal panel structured so as to have excellent anti-shock and impact resisting properties.

SUMMARY OF THE INVENTION

The present invention provides a liquid crystal panel comprising a pair of substrates at least one of which is transparent, a pair of electrodes respectively formed on the substrates so as to face each other, a plurality of linear partition members interposed between the substrates and arranged in parallel at predetermined intervals and alignment coatings respectively formed on the pair of electrodes and provided with uniaxial alignment treatments. The pair of uniaxial alignment treatments have been effected in respective directions crossing at a predetermined angle. Each of the partition members extends in a direction falling within the cross angle. Each of the partition members is bonded to the substrates facing each other to thereby form linear interstices held in the state of being sealed against the liquid crystal in parts other than an opening for passage of the liquid crystal. An antiferroelectric liquid crystal is sealed within each of the linear interstices.

The above liquid crystal panel can be produced by the process of the present invention comprising cooling a liquid crystal panel frame in the state of having a temperature gradient formed and held in relation to the direction of extension of the partition members while proceeding from one end of the linear interstices having the antiferroelectric liquid crystal sealed therein to the other end of the linear interstices so that the antiferroelectric liquid crystal is cooled from a temperature at which the antiferroelectric liquid crystal exhibits a liquid or smectic A phase to a temperature at which the antiferroelectric liquid crystal exhibits a chiral smectic phase.

BRIEF DESCRIPTION OF THE DRAWING

FIG. 1 is explanatory views schematically illustrating layer structures which the chiral smectic phase of the antiferroelectric liquid crystal can have, in which, specifically, FIG. 1(a) shows an ideal bookshelf structure and FIGS. 1(b) to (d) show changes of the state of liquid crystal molecules effected by application of voltage of different voltage value or different polarity;

FIG. 2 is a view showing an optical arrangement for causing the antiferroelectric liquid crystal to display shade;

FIG. 8 is views schematically showing the states of aggregation of liquid crystal molecules obtained by various combinations of rubbing directions, in which, specifically.

FIG. 9 is views schematically showing a tilted bookshelf structure having a high pretilt angle which is obtained by antiparallel rubbing, in which, specifically.

FIG. 11 is a view schematically showing the state in which the liquid crystal molecular layers are bent at the time of cooling of the liquid crystal, in which, specifically.

FIGS. 14(a) to 14(e) are views explaining how to determine a relative deviation angle of the direction of rubbing conducted on each of a pair of upper and lower substrates from the partition member.

DETAILED DESCRIPTION OF THE INVENTION

The liquid crystal panel of the present invention comprises:

a pair of substrates at least one of which is transparent; a pair of electrodes respectively formed on the substrates so as to face each other; a plurality of linear partition members interposed between the substrates and arranged in parallel at predetermined intervals; and alignment coatings respectively formed on said pair of electrodes and provided with uniaxial alignment treatments;

wherein said pair of uniaxial alignment treatments have been effected in respective directions crossing at a predetermined angle; each of the partition members extends in a direction falling within said cross angle; each of the partition members is bonded to the substrates facing each other to thereby form linear interstices held in the state of being sealed against the liquid crystal in parts other than an opening for passage of the liquid crystal; and an antiferroelectric liquid crystal is sealed within each of the linear interstices.

The above pair of electrodes may each consist of either a so-called striped electrode or a plane electrode. The terminology "striped electrode" means an electrode formed by arranging a plurality of linear electrodes at given pitches. A matrix pixel electrode is formed by disposing a pair of striped electrodes so as to face each other at right angles.

Each of the partition members is preferably disposed so as to linearly extend between electrodes of the striped electrode formed on one of the substrates at the same pitches as those of the striped electrode or a plurality of such pitches. The liquid crystal panel in which use is made of the striped electrode is the so-called matrix drive liquid crystal panel. The spacing between the pair of substrates is determined by the partition member, so that the height of the partition member corresponds to the cell gap between the substrates.

The antiferroelectric liquid crystal is preferably set so as to be in the state of a chiral smectic phase selected from the group consisting of chiral smectic $C_A$, chiral smectic $C_\alpha$, chiral smectic $C_\beta$ and chiral smectic $C_\gamma$ phases.

Figure 4:
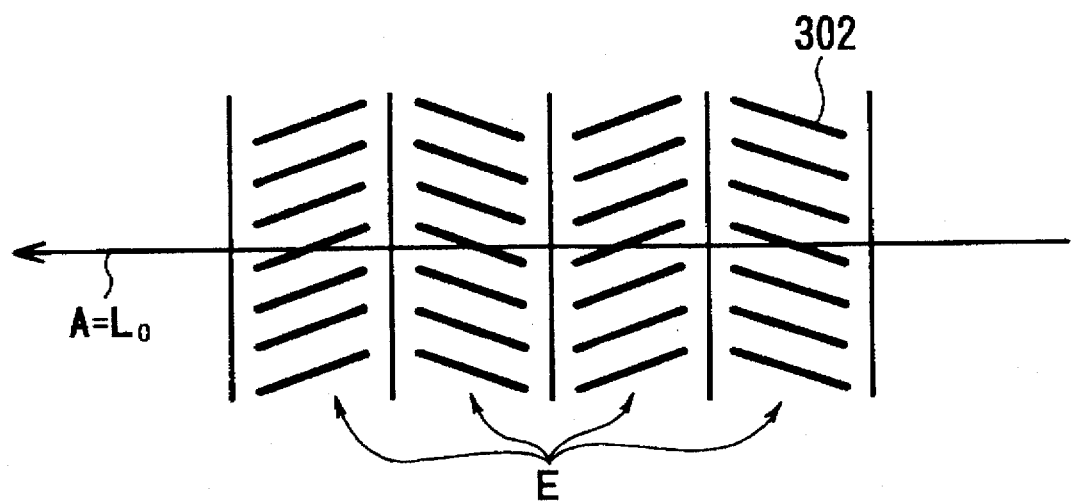
FIG. 4 is a view schematically showing the state in which the rubbing direction is in agreement with the layer normal direction of the liquid crystal molecular layer.
Figure 5:
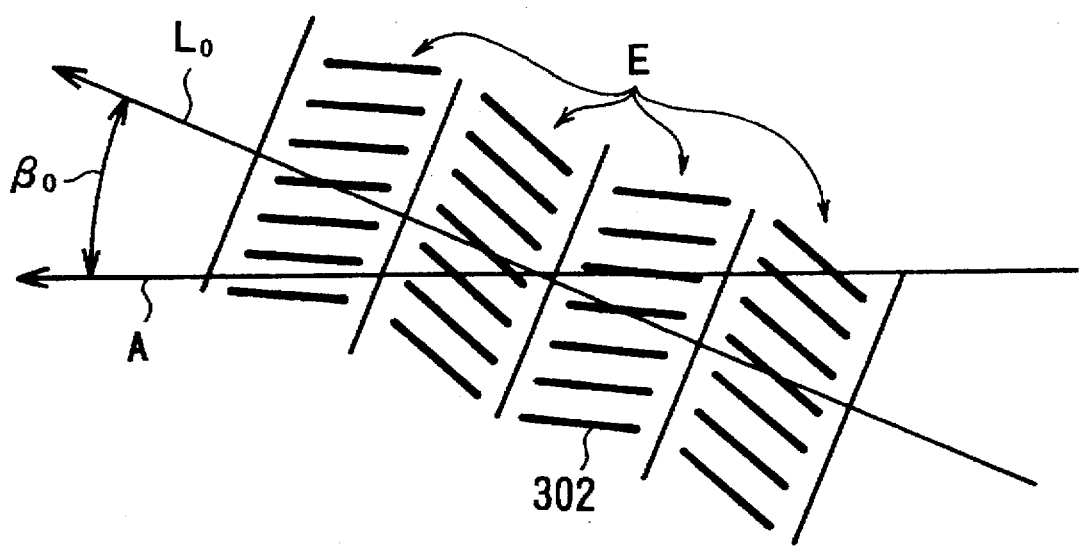
FIG. 5 is a view schematically showing the state in which the rubbing direction is not in agreement with the layer normal direction of the liquid crystal molecular layer.

It is preferred that the above chiral smectic phase have a direction of layer normal which is parallel or substantially parallel to the direction of the extension of the partition members. Referring to FIG. 4, the arrangement of liquid crystal molecular layers E is determined by the uniaxial alignment treatment such as rubbing. FIG. 4 shows the state in which the rubbing direction A agrees with the layer normal $L_0$ of the liquid crystal molecular layers. On the other hand, FIG. 5 shows the state in which the layer normal $L_0$ tilts at an angle of $\beta 0$ from the rubbing direction A.

Whether the layer normal $L_0$ agrees with the rubbing direction A or tilts therefrom depends on the properties of the liquid crystal and the interaction between the liquid crystal and the alignment coating. Generally, tilting of the layer normal $L_0$ from the rubbing direction A occurs with respect to the antiferroelectric liquid crystal while the layer normal $L_0$ substantially agrees with the rubbing direction A with respect to the ferroelectric liquid crystal. In any case, it is preferred that the determined direction of layer normal $L_0$ be parallel or substantially parallel to the partition members. The terminology "substantially parallel" used herein means that any angle formed therebetween is not greater than 15°.

Figure 6:
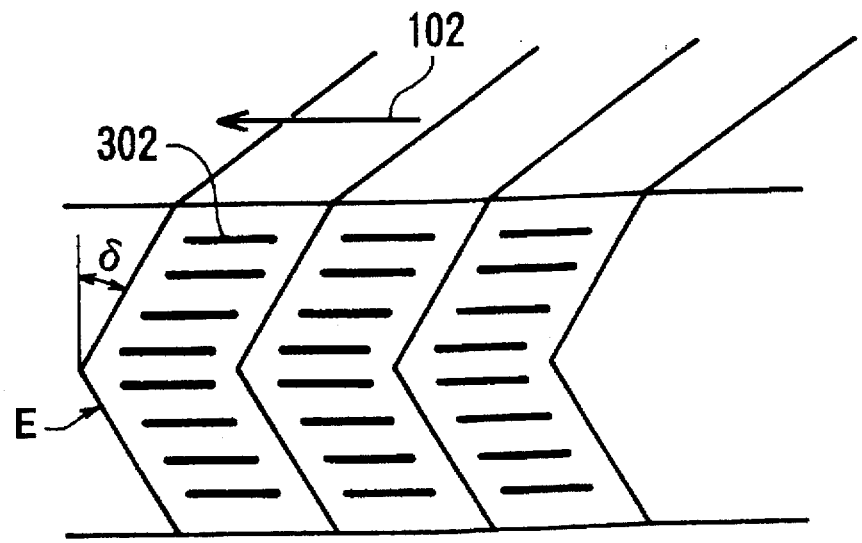
FIG. 6 is a view schematically showing the liquid crystal structure of the chiral smectic phase, especially, the chevron structure.
Figure 7:
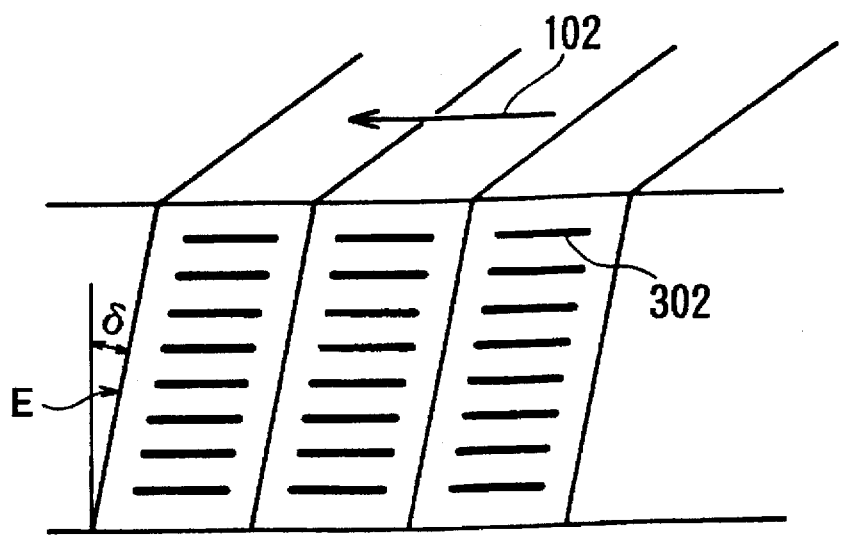
FIG. 7 is a view schematically showing the liquid crystal structure of the chiral smectic phase, especially, a tilted bookshelf structure.

To now, the chiral smectic phase layers have been considered as having a bookshelf structure as shown in FIG. 1(a). However, it has now been found that, actually, they have a chevron structure as shown in FIG. 6 in which the middle of each of the liquid crystal molecular layers E is bent in the shape of "<<" or rarely have an inclined bookshelf structure as shown in FIG. 7. When the shape of "<<" is had, it is preferred that the chiral smectic phase have a direction of layer bending which is identical or substantially identical with that of a chiral smectic phase first precipitated from the smectic A phase. When the inclined bookshelf structure is had, it is preferred that the chiral smectic phase have a direction of layer inclination which is identical or substantially identical with that of a chiral smectic phase first precipitated from the smectic A phase.

The static structure of the zigzag defects will now be briefly described. In a thin layer of about 1 to 3 μm in thickness, the chiral smectic phase layers have not a bookshelf structure as shown in FIG. 1 as opposed to the belief to now and have a chevron structure as shown in FIG. 6 in which the middle of each of the liquid crystal molecular layers E is bent in the shape of "<<" or rarely have an inclined bookshelf structure as shown in FIG. 7. In the chevron structure, the bending can have two directions, i.e., the direction "<<" and the direction ">>". In the inclined bookshelf structure (shown in FIG. 7), the inclination has two directions, i.e., the direction "//" and the direction "\".

Referring to FIG. 8, the liquid crystal molecule 302 (represented by thick full line) present in the vicinity of the substrate has the state of floating at one end thereof at a given angle from the substrate. When this angle is expressed as pretilt angle $\alpha$ and when the $\alpha$ is not 0, the state of aggregation of liquid crystal molecules 302 inside the liquid crystal molecular layer E is different depending on the direction of bending of the liquid crystal molecular layer E.

The uniaxial alignment treatment employed for arranging the liquid crystal put between the substrates in a given direction will be described below. In the following description, the rubbing treatment comprising rubbing the substrate in one direction with an appropriate cloth will be described as the uniaxial alignment treatment. However, the description thereof will naturally apply to another uniaxial alignment treatment, for example, oblique evaporation treatment.

Figure 3:
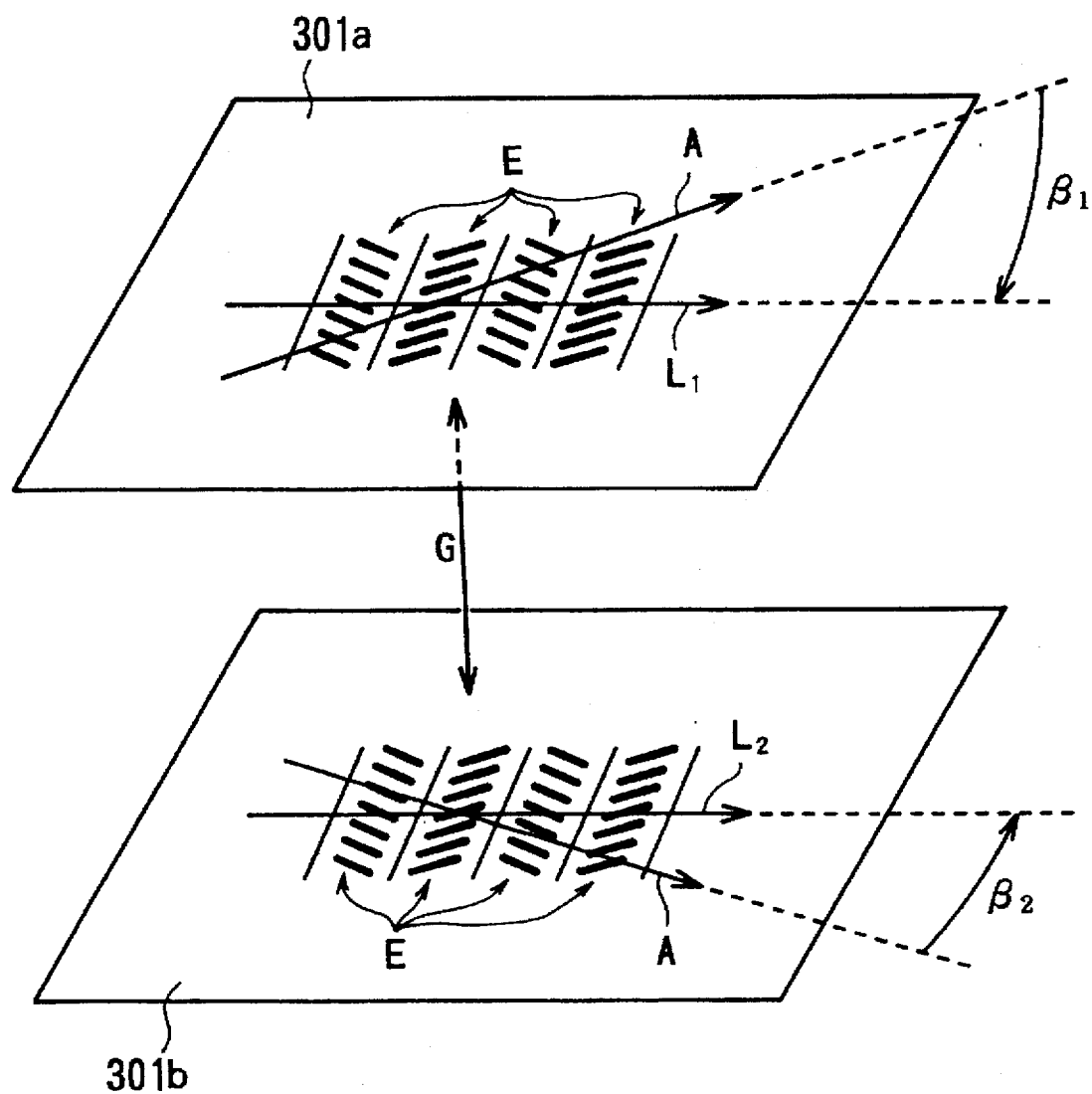
FIG. 3 is a view schematically showing the relationship between the direction of rubbing performed on each of a pair of upper and lower substrates and the layer normal direction of the liquid crystal molecular layer.

Not only when the pair of upper and lower rubbing directions are identical or substantially identical with each other but also when an arrangement is of a so-called cross rubbing in which the upper and lower rubbing directions cross each other as in the present invention, the layer normal 102 of the smectic phase (FIG. 1) has substantially one direction. In this case, changing the combination of upper and lower rubbing directions with the bending direction of liquid crystal molecular layers in the chevron structure provides five modes of aggregation of liquid crystal molecules which can be distinguished in the smectic phase layers as shown in FIG. 8. In the inclined bookshelf structure, there are two modes of aggregation of liquid crystal molecules as shown in FIGS. 9(f) and (g). In FIGS. 8 and 9, the character δ denotes the angle of bending or tilt of molecular layers E. Practically, it ranges from about several to 20 degrees. In the figure, the arrow A indicates the direction of advance of rubbing. In the cross rubbing as in the present invention, the upper and lower rubbing directions are inclined from each other at an appropriate angle of, for example, 30° or less as shown in FIG. 3.

Figure 8A:
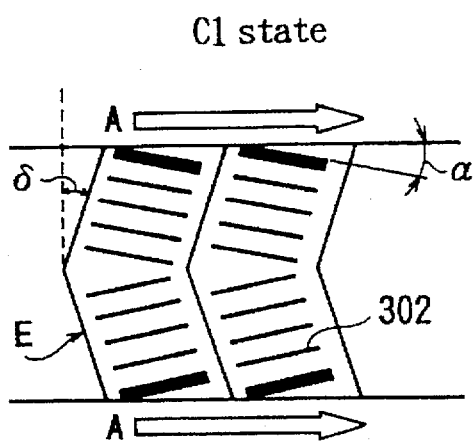
FIG. 8(a) shows the C1 state obtained by parallel rubbing.
Figure 8B:
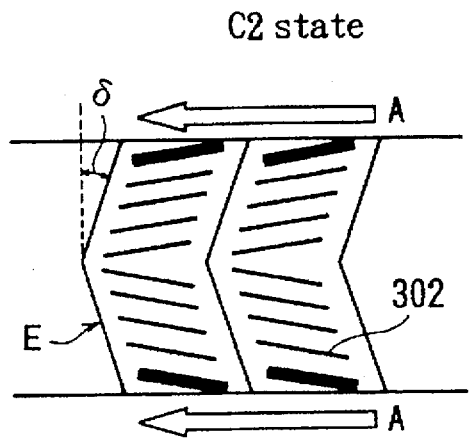
FIG. 8(b) shows the C2 state obtained by parallel rubbing.

With respect to the five modes of arrangements shown in FIG. 8, the arrangements of FIGS. 8(a) and (b) are referred to as the C1 state and the C2 state, respectively (see J. Kanbe et al., Ferroelectrics, 114, 3 (1991)). These are the states of aggregation of liquid crystal molecules obtained by the setting of rubbing in which the upper and lower substrates are disposed so as to face each other in a fashion such that the directions of advance of rubbing have a predetermined cross angle but are directionally identical. This rubbing is called parallel rubbing in accordance with the instance in which the above cross angle is zero. In the C1 state, the liquid crystal molecules 302 pretilt in the same direction as the direction of tilt of the liquid crystal molecular layer E. In the C2 state, the liquid crystal molecules 302 pretilt in the direction opposite to the direction of tilt of the liquid crystal molecular layer E.

Figure 8C:
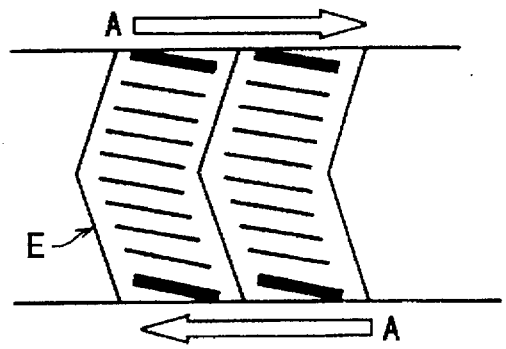
FIG. 8(c) shows the C1/C2 hybrid state obtained by antiparallel rubbing.
Figure 9F:
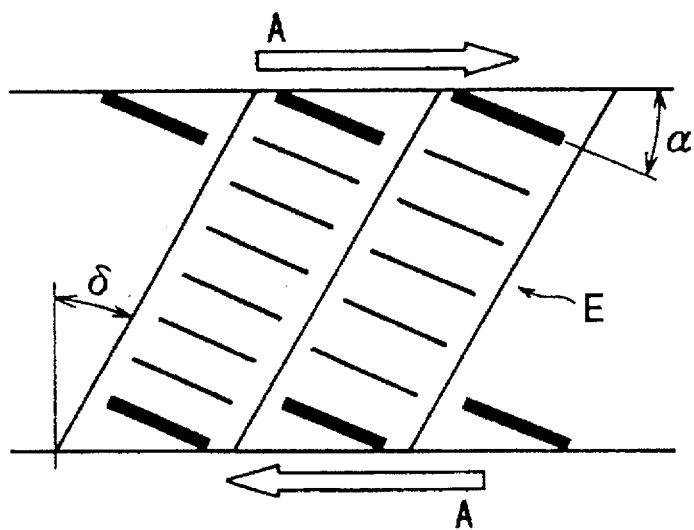
FIG. 9(f) shows the C1 state of aggregation and FIG. 9(g) shows the C2 state of aggregation.
Figure 9G:
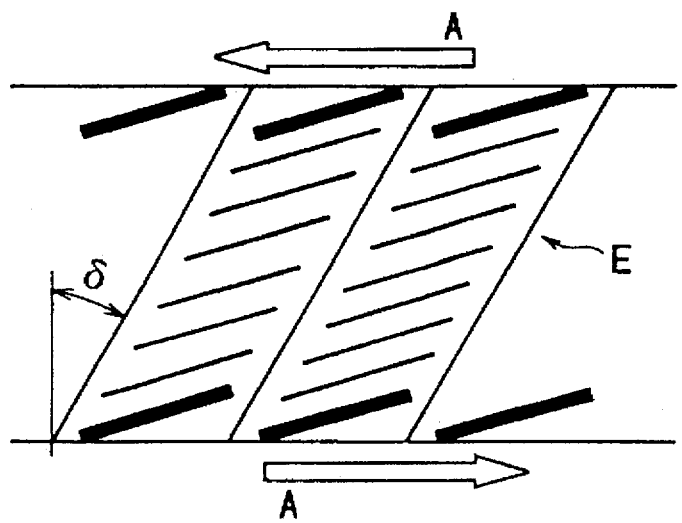

The arrangements of FIGS. 8(c), (d) and (e) have not been given specific designations. Herein, these are referred to as the C1/C2 hybrid state, the one-side C2 state and the one-side C1 state, respectively. The state of FIG. 8(c) is the state of aggregation of liquid crystal molecules obtained by the setting of rubbing in which the upper and lower substrates are assembled together so that the upper and lower rubbing advance directions are opposite to each other, namely, the antiparallel rubbing. In this instance as well, the upper and lower rubbing advance directions are so set as to cross each other at a predetermined angle. The C1/C2 state consists half of the C1 state and half of the C2 state. In this case, those of opposite bending directions cannot be distinguished from each other.

Figure 8D:
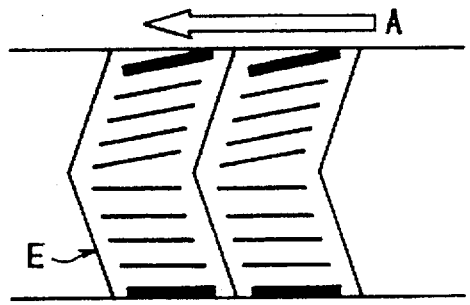
FIG. 8(d) shows the C2 state obtained by one-side rubbing and FIG. 8(e) shows the C1 state obtained by one-side rubbing.
Figure 8E:
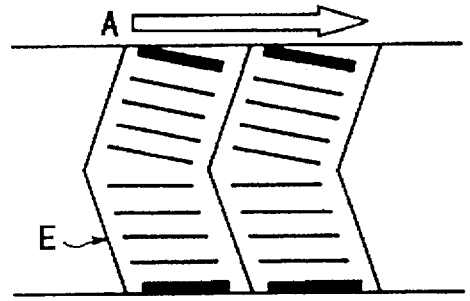

With respect to the states of FIGS. 8(d) and (e), the rubbing treatment is not conducted on the substrate on one side. In these aggregation states, the actual layer structures would be those slightly deformed from the states shown in the figures because of, for example, the change of combination of upper and lower alignment coating materials and the change of conditions for production of alignment coating. The mode of having liquid crystal molecules accommodated in each layer is not a simple homogeneous state as shown in FIG. 8 but may have a state of twist in which the liquid crystal molecules are continuously twisted between the upper and lower substrates.

Figure 10:
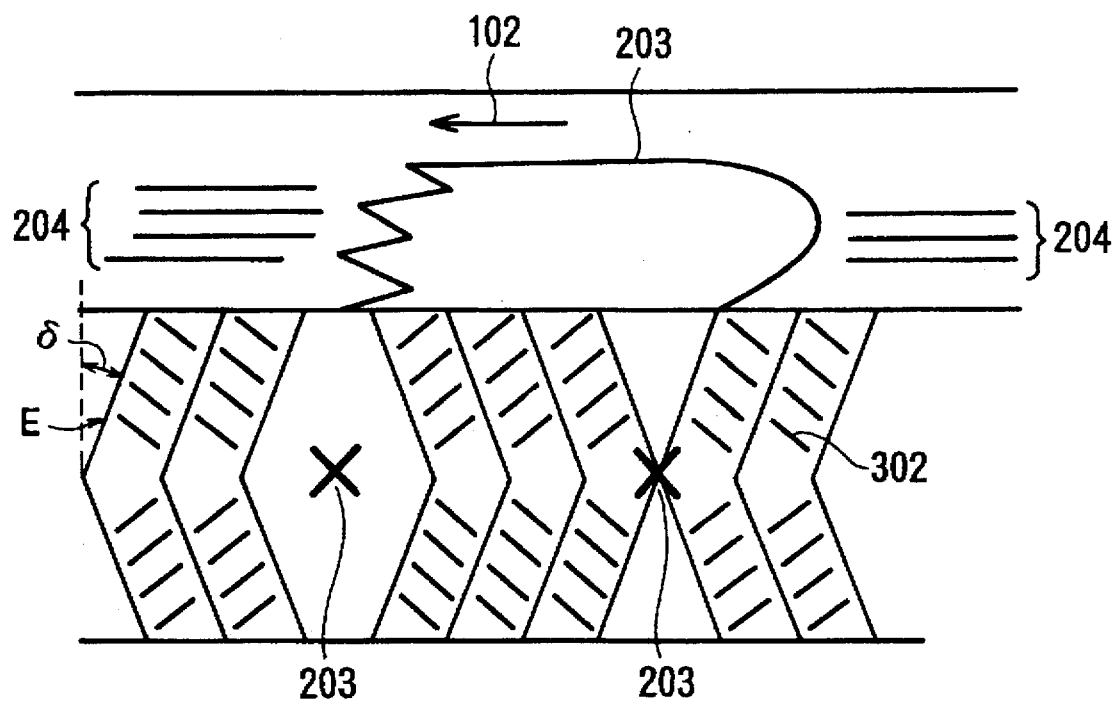
FIG. 10 is a perspective view schematically showing the state in which zigzag defects and quasi-linear defects occur in the liquid crystal.

The zigzag defects occur at parts where two domains different from each other in the direction of bending of liquid crystal molecular layers E join together as shown in FIG. 10. The boundary 203 between the domains having bending directions different from each other appear as zigzag defects. The reason for the occurrence of quasilinear defects 204 has not yet been fully elucidated. However, they may be considered as parts where, when domains of the same bending direction grow and coalesce together, their boundaries remain without disappearing. In the inclined bookshelf structure as well, zigzag defects are developed at boundaries of domains whose directions of inclination are different from each other.

The above alignment defects are likely to occur in the simple cooling, which is defined as a cooling method in which the whole of the liquid crystal panel is uniformly cooled without any temperature gradient. Taking this into account, it is apparently difficult to intentionally select only one from the plurality of aggregation states shown in, for example, FIGS. 8 and 5 when the combination of uniaxial alignment treatment with simple cooling is employed. That is, the layer normal direction 102 of the smectic phase layers is determined by the uniaxial alignment treatment but the direction of layer bending or inclination is not unconditionally determined thereby. If selection and formation of at least either the C1 state or the C2 state of simple structure is realized, the occurrence of zigzag defects can be avoided. However, the means therefor is still unknown. Further, even the technique for allowing a plurality of domains to coexist without any defect is still unknown. Nevertheless, one proposal has been made with respect to the C1 state (J. Kanbe et al., Ferroelectrics, 114, 3 (1991)). It was mentioned therein that, when the pretilt angle α is as large as about the angle of layer bending, the occurrence of the C2 state can be inhibited by simple geometric consideration.

However, the discussion made therein is contradictory in that, although the C2 state is mentioned as being geometrically unallowable, the C1 state per se is formed through another unallowable structure. Even if the discussion is recognized as being valid, the pretilt angle α is required to be regulated to about 20° (>>δ) and this is practically difficult. Further, the scope of the suitable materials is limited. Still further, the below described volume shrinkage of the liquid crystal is not taken into consideration, so that there is no guarantee that the C1 state can constantly be formed securely.

What is most desired is to provide a process for producing a liquid crystal panel which enables selection of any of the aggregation states (see FIG. 8) and which permits the coexistence of such aggregation states without producing defects.

Figure 11A:
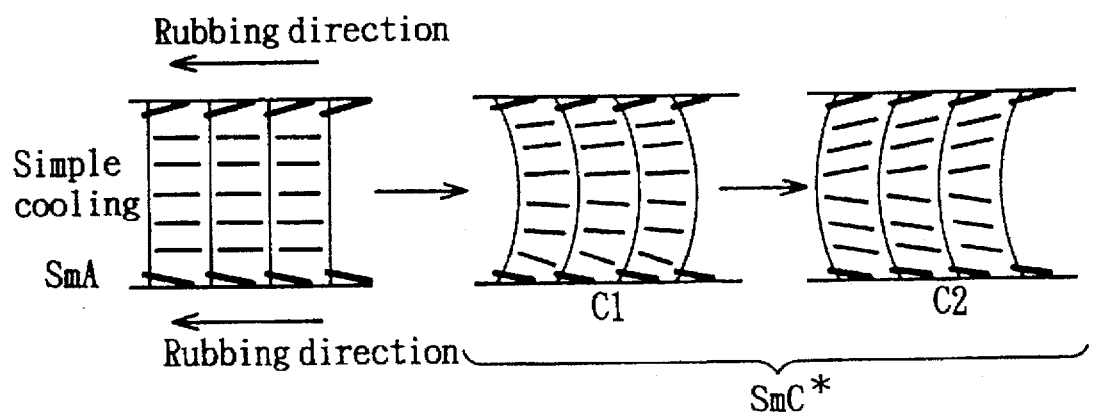
FIG. 11(a) shows the state realized when uniform cooling is conducted in the absence of a temperature gradient.

Now, the reason for the occurrence of zigzag defects and quasi-linear defects will briefly be described. It is seen by microscopic observation that the zigzag defects occur immediately after the first transition of the liquid crystal from the SmA phase to the chiral smectic phase and propagate. In the parallel rubbing in which the upper and lower rubbing directions are parallel or substantially parallel to each other, the first appearing alignment state is the C1 state. This C1 state is converted to the C2 state at temperatures as low as approximately 2° to 6° C. The defects are caused by the occurrence of transition from the C1 state on the high temperature side to the C2 state on the low temperature side. Generally, new defects do not occur in the transition from the SmA phase to the C1 state. The zigzag defects occur because the change from the C1 state to the C2 state as shown in FIG. 11(a) is not effected in all the layers. That is, upon completion of the change to the C2 state, the boundaries between the C2 state and the C1 state remaining unchanged form the zigzag defects. Further, even if the above change is seemingly completed all over the area, defects sometimes occur, which are known as quasi-linear defects. These are association parts remaining without disappearing, which association parts result from growth of a plurality of domains of the C2 state generated inside a domain of the C1 state followed by their coalescence.

Below, that the change from the C1 state to the C2 state is an inevitably occurring phenomenon will qualitatively be described. The reason for the bending of the liquid crystal molecular layer is the extension of the liquid crystal molecular layer along the cell gap of the liquid crystal panel in accordance with the cooling of the liquid crystal. The reason for the extension of the liquid crystal molecular layer is the reduction of the layer interval attributed to the tilt of the liquid crystal molecules from the layer normal direction under the condition that the volume of the liquid crystal is substantially constant within the cell gap. That is, the layer extends along the cell gap as much as the reduction of the layer interval. The first extension is absorbed by the bending to the C1 state. However, as it is, the absorption of a subsequent extension becomes energetically difficult. The bending in the C1 state requires a large amount of energy, so that a change is inevitable to the state of aggregation in which an energy increase is less as per the layer bending, i.e., the layer extension. Specifically, although neighboring liquid crystal molecules are positioned in fairly parallel relationship in the C1 state by reflecting the structure of the SmA phase, as they are, drawing the liquid crystal molecules close to each other leads to an increase of resiliency at the core part, so that the liquid crystal molecules slide along the molecular axis or a change is effected to a mutual arrangement ensuring easy sliding, i.e., the C2 state.

Figure 11B:
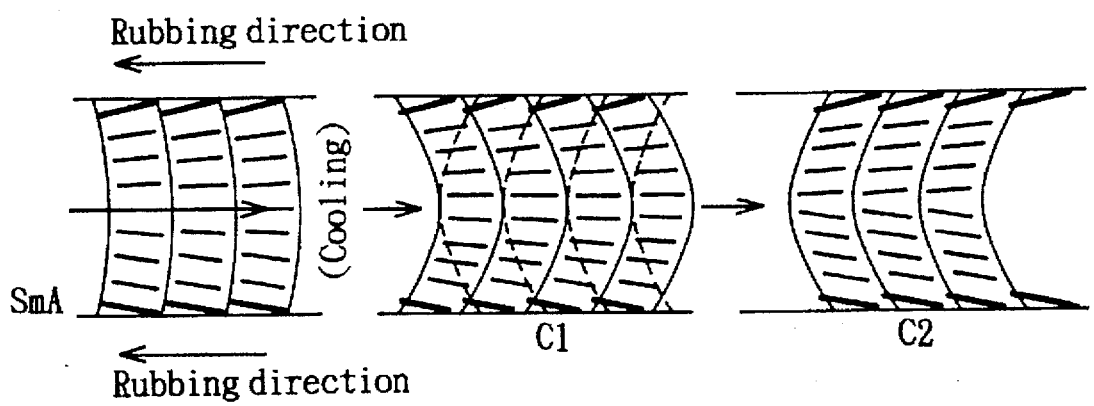
FIG. 11(b) shows the state realized when the cooling is conducted from the direction of the start of the rubbing and FIG. 11(c) shows the state realized when the cooling is conducted from the direction of the termination of the rubbing.

It is important to note here that the change from the C1 state to the C2 state is not caused by the backward slide of the layers as a whole so as to bend. Referring to FIG. 11(b), the C1 state indicated by the full line can be considered as being the C2 state indicated by the broken line. That is, the C1 state can be converted to the C2 state by slight displacement of neighboring liquid crystal molecules.

However, the change of the state of aggregation of the liquid crystal from the C1 state to the C2 state is always accompanied by the occurrence of defects (FIG. 11(a)). Especially, quasi-linear defects being the vestiges of association of domains remain in the C2 state. If the change were discontinued in the C1 state, no quasi-linear defects would occur. An alternative means would be minutely partitioning the space in which the liquid crystal is sealed to thereby avoid the association. However, such minutely partitioning encounters a limit and practically it is infeasible. Generally, zigzag defects 203 (see FIG. 10) are absent in the C2 state but quasi-linear defects 204 are present therein. In the C1/C2 state, quasi-linear defects are absent but the occurrence of zigzag defects is inevitable.

Thus, the obtainable conclusion is that defects cannot be avoided as long as there is some structural change altering the direction of bending of the liquid crystal molecular layer. The antiferroelectric liquid crystal has two types of transition schemes, i.e., one from the SmA phase via the SmC* phase to the antiferroelectric state, for example, the $SmC_A^*$ phase and the other from the SmA phase directly to the $SmC_A^*$ phase. Therefore, defects would inevitably occur in the event of the following changes:

(1) SmA phase→C1 state→C2 state→$SmC_A^*$ phase, (2) SmA phase→$C_A1$ state→$C_A2$ state, (3) SmA phase→C1 state→$C_A2$ state, and (4) SmA phase→SmC* phase→$C_A1$ state→$C_A2$ state.

Herein, each of $C_A1$ and $C_A2$ represents the state of bending similar to the SmC phase of the $SmC_A^*$ phase.

Therefore, the following means would be available for entirely avoiding the occurrence of defects in the layers of the chiral smectic phase.

(1) To prolong the C1 state to low temperatures while inhibiting the change from the SmC* phase (C1 state) on the high temperature side to the SmC* phase (C2 state) on the low temperature side;

(1') To prolong the $C_A1$ state to low temperatures while inhibiting the change from the $SmC_A^*$ phase (CA1 state) on the high temperature side to the $SmC_A^*$ phase ($C_A2$ state) on the low temperature side; and (2) To derive the direct change from the SmA phase to the C2 or $C_A2$ state on the low temperature side.

As mentioned above the state change of C1 state→C2 state ($C_A2$ state) may occur in the means (1) and (1') above. However, this state change can be avoided by the selection of the material or special contrivance. The state change (2) above can be realized at any times.

Another example suggesting that the oppositely directed structural change of the liquid crystal molecular layer is a problem is encountered in the C1/C2 hybrid formed by the antiparallel rubbing. In this case, if the conditions of the upper and lower rubbing treatments are identical, the two aggregation states having liquid crystal molecular layer bending directions contrary to each other (FIG. 8(c)) are entirely equivalent to each other, so that there is no difference recognized between the C1 state and the C2 state. That is, the C1 state and the C2 state are likely to occur at equal probabilities in either of the two aggregation states having liquid crystal molecular layer bending directions contrary to each other. Therefore, although zigzag defects would occur, the change of bending direction would not occur, so that quasi-linear defects would not be found. This shows the nonoccurrence of the structural change such as C1 state→C2 state.

In summing up, the defect avoiding conditions are those not causing such a structural change as will alter the direction of bending of the liquid crystal molecular layer in the state of chiral smectic phase. This structural change can be prevented by either inhibiting the change from the C1 state to the C2 state or directly deriving the C2 state from the SmA phase with respect to the parallel rubbing. With respect to the antiparallel rubbing, the above structural change can be prevented by fixing the direction of bending of the liquid crystal molecular layer. In this connection, briefly, the chiral smectic phase first precipitated from the SmA phase has a single layer bending direction and holding this direction until room temperature leads to fixing of the direction of bending of the liquid crystal molecular layer.

A liquid crystal panel structured so as to be effective in inhibiting or avoiding a specified structural change and a practical process for producing such a liquid crystal panel will be illustrated below. As already pointed out, a pair of uniaxial alignment treatments determine the layer normal direction of liquid crystal molecular layers but do not unconditionally determine the layer bending direction. The inventor has made detailed analysis to find whether or not there is any other determinative factor governing the layer bending direction. As a result, it has been found that the direction of volume shrinkage, i.e., liquid crystal move caused by the cooling has a determinative effect on the layer bending direction.

In particular, it has been found that the layer bending direction can be controlled by inducing the deformation of the liquid crystal molecular layer through the move of the liquid crystal inside the liquid crystal panel. It has also been found that there is possibility that the move itself improves the alignment state, and that the move of the liquid crystal can be controlled by devising the shape of the space in which the liquid crystal is held and the method of cooling the liquid crystal. It has further been found that the configuration of the above space is preferred to be narrow and slender. Still further, the rule has empirically been found that when there are temperature gradients in both the direction of extension of the space for liquid crystal sealing and the layer normal direction of liquid crystal molecular layers at the time of the formation of the liquid crystal molecular layers, the liquid crystal moves toward a site where the temperature has previously dropped with the result that the liquid crystal molecular layers are bent in that direction.

Figure 11C:
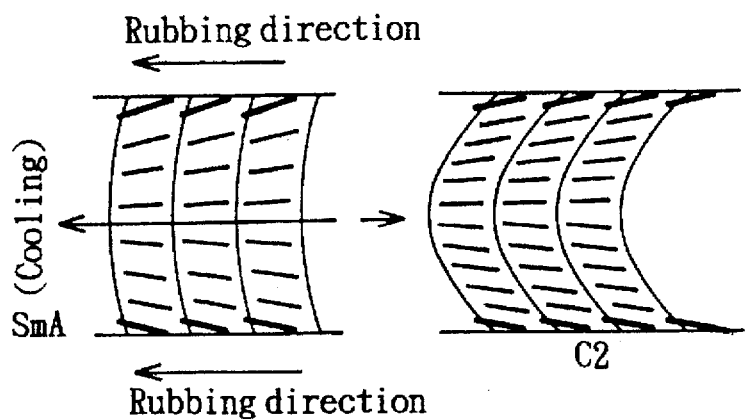

This rule will be described referring to FIG. 11 in the use of parallel rubbing as an example. A volume shrinkage of the liquid crystal relative to the panel frame is inevitably caused by the cooling of the liquid crystal. The portion of the liquid crystal in the vicinity of the alignment coating has relatively low mobility, so that the shrinkage force works as a force drawing the center of the layer toward the cooling point. As a result, the center of the layer is moved while maintaining the layer structure toward a point where the temperature has previously been lowered. Thus, when being in the state of SmA phase, the layer is already bent toward the cooling point (FIG. 11(b) and (c)). Consequently, the cooling from the direction of the C2 state leads to the direct transition to the C2 state without passing through the C1 state (FIG. 11(c)) because the SmA phase per se has a structure similar to the C2 state. This also applies when the cooling is conducted from the direction of the C1 state (FIG. 11(b)).

The above formation of a temperature gradient along the layer normal enables forcing all the liquid crystal molecular layers to bend in the same direction, thereby leaving no room for the occurrence of defects. Actually, when the cooling is conducted from the direction of the C2 state, no alignment defects occur including quasi-linear defects. As already pointed out, when the cooling is conducted from the direction of the C1 state, zigzag defects occur depending on the liquid crystal and occasionally quasi-linear defects appear only inside the domain of the C2 state. This shows the generation of backward bent C2-state domain in the C1-state domain (FIG. 11(b)). Generally, the transition of phase state can be terminated at the C1 state by regulating the degree of SmA-phase or C1-state bending deformation. These are universal effects not depending on the conditions of parallel rubbing and antiparallel rubbing, the material of the alignment coating, the liquid crystal, etc.

Another reason for the absolute necessity of the temperature gradient resides in preventing the random occurrence of SmA-phase domains precipitated from the liquid phase at various parts inside the liquid crystal panel, followed by association thereof. The SmA-phase domains are only present in the transverse direction with respect to the direction of temperature gradient, so that association of domains does not occur at all in the direction of temperature gradient. Although the occurrence of association of domains is conceivable in the transverse direction with respect to the direction of temperature gradient, the number of such domain associations can be minimized by the presence of the partition members. Even if the conformability between the domains is excellent, the smaller the number of domain associations, the greater the advantage. The number of domain associations can be minimized by the structure of the present invention in which linear interstices sealed by a plurality of partition members are formed and the antiferroelectric liquid crystal is put in the linear interstices.

Figure 12:
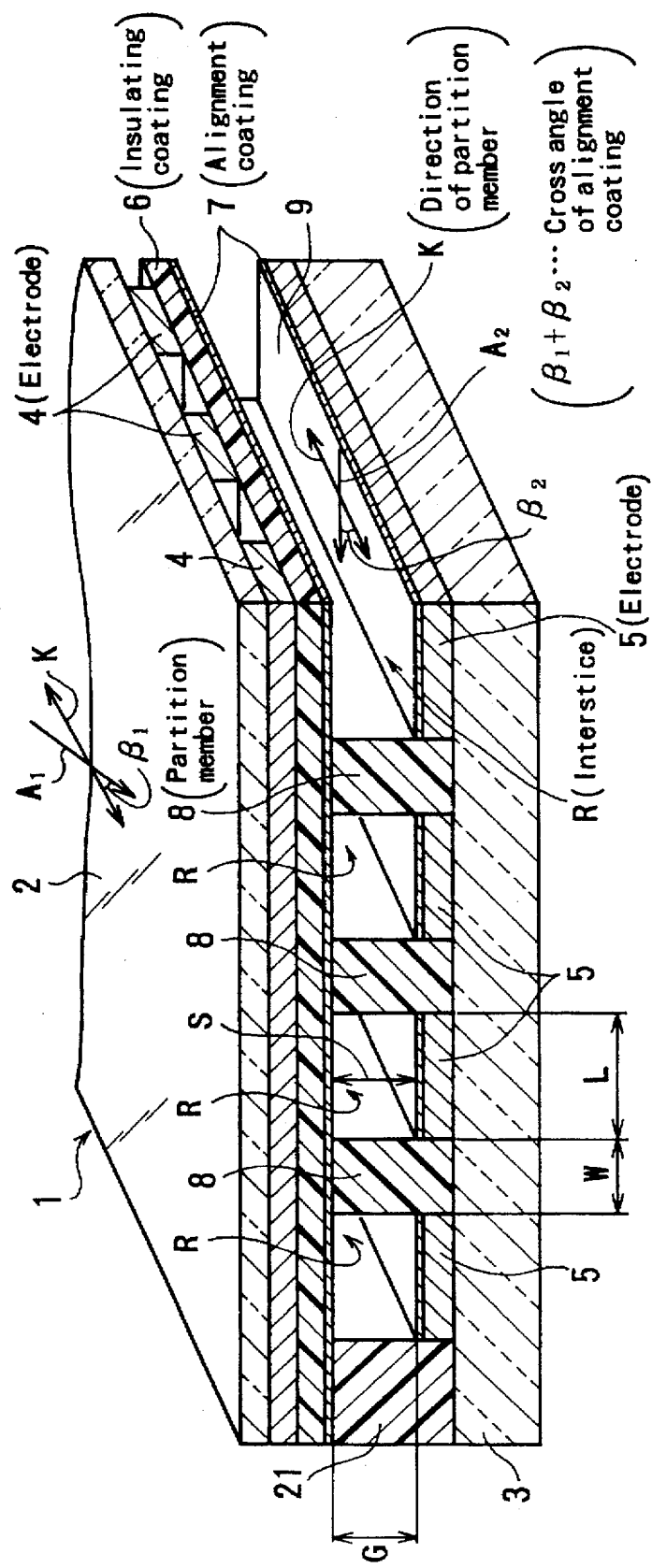
FIG. 12 is a perspective view showing the structure of a section of one form of the liquid crystal panel according to the present invention.

The liquid crystal panel of the present invention has a structure preferred from the viewpoint of the centralization of the shrinkage force acting on the liquid crystal under a temperature gradient in the direction of layer normal of the liquid crystal molecular layers. FIG. 12 shows an example of such a liquid crystal panel. In the liquid crystal panel 1, linear partition members 8 each having a thickness corresponding to the cell gap G are each formed between neighboring striped transparent electrodes 5 formed on one of a pair of glass substrates 3. Another glass substrate 2 is bonded to the partition members 8 by appropriate means, whereby the pair of substrates are completely bonded together. Further, a liquid crystal panel frame for liquid crystal sealing having the cell gap G precisely specified is constructed. Numerals 7, 9 denote alignment coatings composed of, for example, polyimide. Numeral 4 denotes a counter transparent electrode which is disposed so as to face the above transparent electrode 5 and which extends in striped fashion at a right angle to the transparent electrode 5. Numeral 6 denotes an insulating coating. A thin coating of alumina or silica having a thickness of about 100 nm (1000 Å) can be used as the insulating coating. A color filter can be provided on the upper or lower side of either of the transparent electrodes. The above structure provides linear interstices R each formed between the neighboring partition members 8. The antiferroelectric liquid crystal is sealed in these linear interstices R, thereby obtaining the liquid crystal panel 1.

Figure 13:
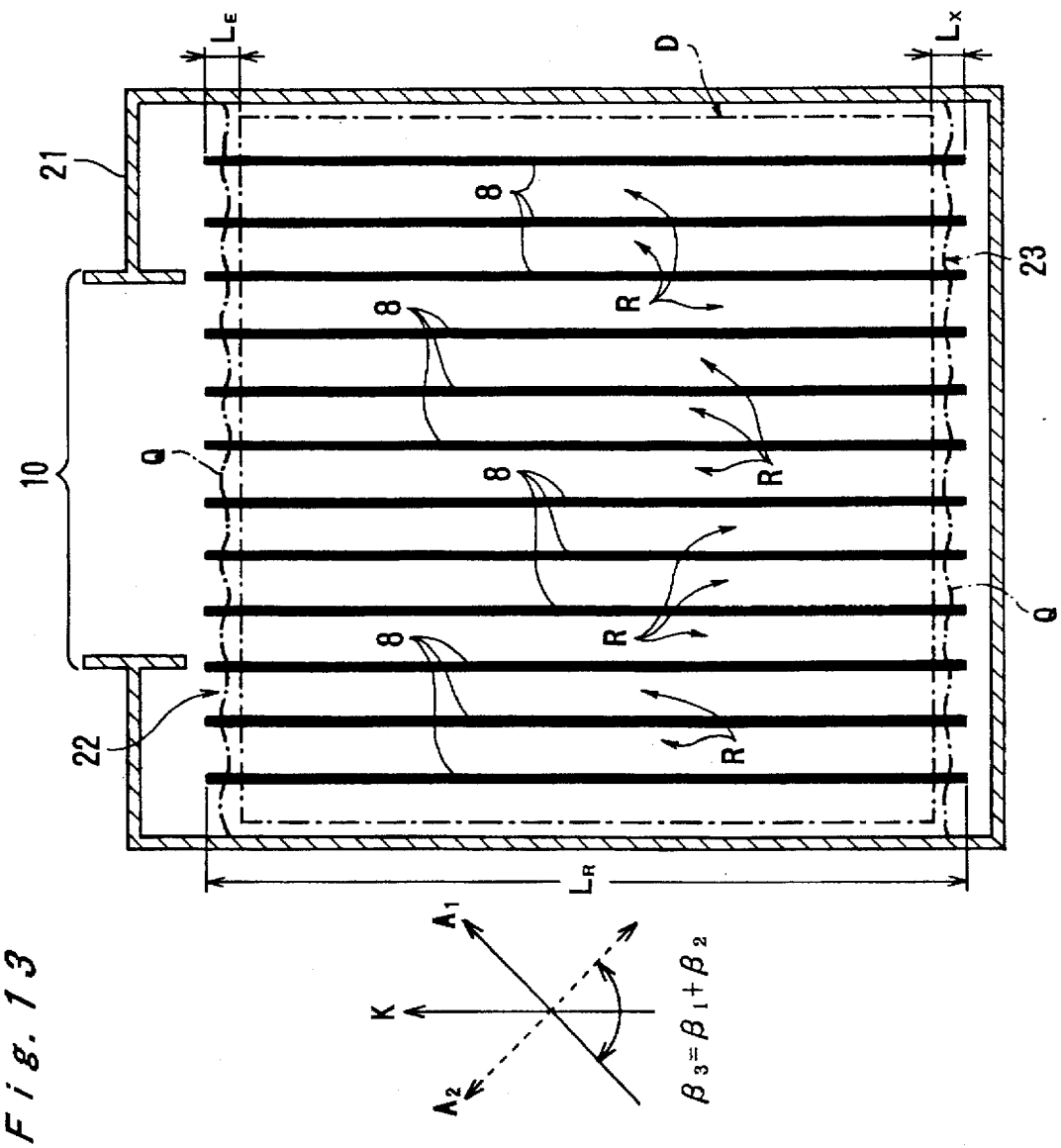
FIG. 13 is a planar sectional view of the liquid crystal panel of FIG. 12, which especially illustrates partition members disposed in striped fashion.

FIG. 13 is a front view of the liquid crystal panel 1. The linear interstices R provided on the striped electrode 5 are divided from each other by the partition members 8 and each thereof makes a complete closed space except for the openings at the front edge part 22 and at the rear edge part 23. That is, the linear interstices R are impermeable to any liquid at the parts other than the openings. A sectional form of each linear interstice R is a flat quadrilateral, i.e., a rectangle as shown in FIG. 12. In this case, the long side L of the rectangle as the minimum width is automatically set at, for example, about 50 to 500 µm approximately equal to the length of the striped electrode 5. The short side S of the rectangle is set at, for example, 1 to 3 µm approximately equal to the cell gap G. The sectional form of the linear interstice R is generally not a complete quadrilateral because of the difference in level attributed to the thickness of the transparent electrode 5, the roundness of each of the four corners, etc.

The width W of each partition member 8 as a partition for dividing the linear interstices R is set at up to about the distance between neighboring electrodes 5, for example, 10 to 100 µm. The length $L_R$ of each linear interstice R (FIG. 13) is set at greater than, for example, 10 to 40 cm which is the length of the electrode exposed as a display part D of a liquid crystal display. This setting is made taking into account the alignment abnormality Q of about 5 to 10 mm in length observed at the liquid crystal inlet and outlet of each linear interstice R.

Referring to FIG. 12, the direction K of extension of each partition member 8 is parallel to the electrode 5 on one side. The angles of the upper and lower rubbing directions $A_1$ and $A_2$ from the direction K of extension of each partition member 8 are $\beta 1$ and $\beta 2$, respectively. These angles are determined so that the layer normal direction of the liquid crystal molecular layer which is determined by rubbing becomes parallel or substantially parallel to the direction K of extension of each partition member 8. The direction K of extension of each partition member 8 is naturally included in the cross angle $\beta$ ($=\beta 1+\beta 2$). Generally, the greater the deviation of the layer normal direction of the liquid crystal molecular layers from the direction K of extension of each partition member 8, the harder the smooth advance of the shrinkage of the liquid crystal. Thus, the probability of defect occurrence is increased. Experiments showed that it is preferred from the viewpoint of preventing defects that $\beta 1$ or $\beta 2$ be caused to fall within ±15° from the direction K of extension of each partition member 8.

In the liquid crystal panel 1 shown in FIG. 12, linear partition members 8 are provided without exception between respective neighboring electrodes of the striped electrode 5 and the upper and lower substrates 2, 3 are bonded together by means of the partition members 8. The liquid crystal moves straight in each linearly partitioned narrow interstice R and does not meander, so that the liquid crystal is free from the accumulation of strain and the formation of voids therein. By virtue of this structure, the number of domain associations is reduced even during the growth of the SmA phase. Further, the shrinkage of the liquid crystal which is caused by the cooling of the liquid crystal is limited to the direction of extension of the interstice R, so that mutual interference between linear interstices can be avoided.

The above structure including linear interstices is also available in a liquid crystal panel in which use is made of a plane electrode. This type of electrode is employed in a laser (addressing) display. In this structure, the partition member pitch is determined taking into account a satisfactory resistance to press, shear and other external force, a satisfactory bonding strength for joining a pair of substrates together, a required distance of move, a required degree of deformation of a liquid crystal molecular layer, a rate of liquid crystal infiltration, etc. Experiments showed that it is safe to set the pitch at 2 mm or less.

In the conventional liquid crystal panel, usually, the cell gap between a pair of substrates is secured by spherical beads or other spacer and, however, the substrates are not bonded together. This conventional liquid crystal panel has encountered the following problems:

(1) thermal shrinkages cannot be synchronized between the liquid crystal and the substrate in the presence of a temperature gradient, so that any appropriate alignment layer cannot be obtained;

(2) the liquid crystal panel has not antishock and impact resisting properties, so that it is likely to damage in the process of producing the display or during the operation thereof; and (3) it is difficult for the liquid crystal to linearly and uniformly infiltrate into the depth of the liquid crystal panel, so that air pocket is likely to occur in the liquid crystal and that, also, meandering is caused to thereby induce defects.

It is known that the layer structure of the antiferroelectric liquid crystal is highly resistant to impact and has self-repairing capability. However, in practice, once the layer structure of the antiferroelectric liquid crystal is broken by lightly pressing the liquid crystal panel, the layer structure cannot be restored to the original state. In the structure of the present invention, even if defects occur on impact, these disappear in a short time, so that the layer structure can be restored to the original state. With respect to an antiferroelectric liquid crystal display of the direct viewing type having a diagonal length of about 25 to 40 inches, when both the substrates are not bonded together as in the prior art, vertically standing the liquid crystal panel may cause enlargement of the bottom part of the substrate attributed to the weights of the substrate per se and the liquid crystal and also may cause damaging of the liquid crystal present at the bottom because of the above weights. By contrast, the liquid crystal panel in which both the substrates are strongly bonded together directly or indirectly by means of the striped partition members according to the present invention enables not only reliable prevention of damaging of the liquid crystal but also uniformly holding the cell gap all over the surface of the liquid crystal panel.

The partition member can appropriately be selected from various polymeric photoresists. The polymeric compounds soften and exhibit adherence when held at temperatures not lower than the respective glass transition temperatures. Upon completion of bonding, cooling is effected. Thus, the pair of substrates can flexibly and strongly be bonded together.

The above cooling of the liquid crystal panel while providing a temperature gradient therefor comprises moving the liquid crystal panel at an appropriate rate from a high temperature atmosphere to a low temperature atmosphere. Examples of the thermostatic atmospheres for realizing the above high temperature atmosphere and low temperature atmosphere include a gas in an oven or the like (1), a solid such as a hot stage, a Peltier element or the like (2), a liquid such as water, silicone oil, an oil or the like (3) and radiation such as infrared or the like (4), from which a suitable one can be selected. The cooling methods preferred from the viewpoint of temperature stability and productivity are one comprising lifting the liquid crystal panel from a liquid, especially, water of high temperature and another comprising passing the liquid crystal panel through a tunnel kiln at an appropriate velocity.

It is preferred that a heat insulating material capable of preventing heat leakage should be interposed between the thermostatic high temperature part and the thermostatic low temperature part. This enables rendering the temperature gradient provided on the liquid crystal panel constant and stable. With respect to the moving of the liquid crystal panel substantially in parallel to the partition member, two oppositely directed moving modes can be realized by exchanging the front edge of the liquid crystal panel with the rear edge thereof. In the practical cooling of the liquid crystal panel, a desirable one is selected from the above cooling methods. With respect to the high temperature state, although it is desired to employ the temperature at which the liquid crystal exhibits a liquid phase, it is satisfactory to employ the temperature which falls in a high temperature part of the temperature range corresponding to the SmA phase if the temperature range is broad. The rate at which the liquid crystal panel is moved is 5 cm/min or less, preferably, 10 to 2 mm/min.

EFFECT OF THE INVENTION

In the liquid crystal panel, the uniaxial alignment treatment for the antiferroelectric liquid crystal is performed according to the cross rubbing method. This enables prevention of the occurrence of twist, irregularity or the like in the smectic phase layer of antiferroelectric liquid crystal interposed between a pair of substrates, thus, prevention of the occurrence of miscellaneous defects different from zigzag defects and quasi-linear defects, so that an ideal layer structure of the smectic phase can be formed.

Generally, defects such as zigzag defects and quasilinear defects occur in the liquid crystal when the antiferroelectric liquid crystal is introduced in the conventional liquid crystal panel frame, for example, the liquid crystal panel frame of the form having a pair of substrates arranged so as to face each other with a spacer such as beads interposed therebetween without mutual bonding (1) and when the alignment treatment for the antiferroelectric liquid crystal is conducted by the conventional cooling method, for example, that in which all the surface of the liquid crystal panel is uniformly cooled without a temperature gradient (2). When the above miscellaneous defects are present in the antiferroelectric liquid crystal, defects such as zigzag defects are hidden thereby, so that the presence of the defects often cannot be visually recognized. Nevertheless, when the smectic phase layer structure of the antiferroelectric liquid crystal is completed by the use of the cross rubbing method according to the present invention, the hidden defects such as zigzag defects are visualized.

However, the introduction of the antiferroelectric liquid crystal along the linear interstices partitioned by the partition members in hermetically sealed relationship according to the present invention enables uniform, linear and complete filling of the antiferroelectric liquid crystal into the depth of the liquid crystal panel frame. As a result, the occurrence of voids and meander can securely be prevented. The absence of defects caused thereby enables effective prevention of leakage of light from a back-light, so that an alignment state ideal as a dark state in the liquid crystal display including the antiferroelectric liquid crystal can be obtained.

Further, in the present invention, a pair of substrates were bonded together by means of a plurality of striped partition members, so that a liquid crystal panel structure was obtained which was excellent in antishock and impact resisting properties as compared with those of the conventional liquid crystal panel in which the cell gap was simply secured by means of a spacer such as beads without mutual bonding of the pair of substrates. A very large liquid crystal panel having a diagonal size of at least 25 inch, especially, about 40 inch can also be provided with satisfactory antishock and impact resisting properties by the present invention.

The liquid crystal panel of the present invention not only enables prevention of the occurrence of twist, irregularity or the like in the liquid crystal molecular layer of antiferroelectric liquid crystal, thus, prevention of the occurrence of miscellaneous defects in the liquid crystal but also enables secure prevention of defects such as quasi-linear defects attributed to nonsmooth shrinkage by virtue of the setting of the layer normal direction of the liquid crystal molecular layers in parallel to the direction of extension of the partition members.

The liquid crystal panel of the present invention can render the layer structure of the liquid crystal molecular layers more uniform all over the liquid crystal panel, thereby enabling securer prevention of the occurrence of zigzag defects and quasi-linear defects.

The process for producing a liquid crystal panel of the present invention provides the cooling method most suitable for obtaining an antiferroelectric liquid crystal aligned in nondefective form in the liquid crystal panel. More particularly, a temperature gradient is formed along narrow hermetically sealed linear interstices having a liquid crystal introduced therein and the temperature gradient is gradually moved along the linear interstices to hereby successively cool the liquid crystal. Thus, the direction of bending or tilt of the liquid crystal molecular layer is forced to direct at a fixed angle, thereby enabling secure prevention of the occurrence of defects such as zigzag defects.

The present invention will further be illustrated with reference to the following Examples, which, however, in no way limit the scope of the invention.

EXAMPLE

Example 1

Referring to FIG. 12, a striped transparent electrode 5, i.e., a plurality of transparent electrodes of 270 μm in line width and 150 nm in thickness were formed in longitudinally parallel relationship at pitches of 300 μm on the surface of a glass plate 3 of the A4 size (297 mm×210 mm) as a substrate. Alignment coating solution whose polyimide resin concentration was 2% "HL1110" (produced by Hitachi Chemical Co., Ltd.) was applied on the striped transparent electrode 5 formed on the glass plate substrate 3 by spin coating effected at 1000 rpm for 20 sec and fired at 180° C. for 1 hr, thereby forming a polyimide alignment coating 9 of 100 nm in thickness.

Subsequently, rubbing as uniaxial alignment treatment was conducted on the polyimide alignment coating 9 in a direction having an angle of $\beta 2$ (detailed later) from the longitudinal direction of the transparent electrode 5. The alignment coating 9 was further spin coated with photoresist of the same positive type "MP-S1400" (produced by Shipley Far East Ltd.) at a thickness of 1.7 μm and dried at 90° C. The photoresist was exposed to radiation with the use of a mask having a stripe pattern of partition member 8 shown in FIG. 13, developed by a given alkali developer and postbaked at 150° C. for 60 min, thereby forming a vast plurality of partition members 8 each of 30 μm in width (the resultant assemblage herein referred to as "assemblage of substrate 3"). These partition members 8 were uniformly positioned between respective neighboring transparent electrodes 5, viz., at the same pitches as in the transparent electrodes 5. The display part D was square with a size of 12 inch in diagonal length. Numeral 21 of FIGS. 12 and 13 denotes a sealant of about 2 mm in width surrounding the periphery other than liquid crystal infiltration ports 10, which was formed simultaneously with the formation of the partition members 8.

In the same manner, a striped transparent electrode 4 was formed on another glass plate substrate 2, and further an insulating coating 6 and a polyimide alignment coating 7 in this order were successively formed on the transparent electrode 4, followed by rubbing (the resultant assemblage herein referred to as "assemblage of substrate 2"). The insulating coating 6 was provided to prevent short circuit between the upper and lower electrodes, which was formed from a silicon oxide at a thickness of 100 nm in thickness. For fabricating a color display, a color filter can be provided under or over the transparent electrode on one side. The rubbing was conducted on the polyimide alignment coating 7 on the substrate 2 in a direction having an angle of $\beta 1$ (detailed later) from the direction perpendicular to the longitudinal direction of the transparent electrode 4. Further, the photoresist of the positive type was applied all over the surface, dried and stripped off. This treatment was performed in order to render the properties of the alignment coatings 7, 9 on the glass plate substrates 2, 3 identical with each other.

The thus prepared assemblage of substrate 2 and assemblage of substrate 3 were positioned so that the respective rubbing directions crossed each other at an angle of $\beta_C$ (detailed later) to thereby constitute antiparallel rubbing relationship, so that the striped transparent electrodes 4, 5 crossed each other at right angles and so that the partition members 8 were interposed between the striped transparent electrodes 4, 5 and were piled one upon the other while maintaining their positional relationship. Thereafter, the space between the substrates 2, 3 was evacuated to thereby secure them together. At this stage, usually, the substrates 2, 3 were clamped by means of a given tool. However, the tool is not shown in the drawing. The clamped assemblages were heated to 170° C., held at the temperature for 1 hr and cooled while holding them secured together. Thus, a liquid crystal panel frame of 1.5 μm in cell gap having complete bonding effected at the region of the display part D (see FIG. 13) as well was obtained.

The cross angle of the above pair of rubbing directions is as shown in FIG. 14(a). In the figure, the rubbing direction $A_1$ on the substrate 2 which is positioned upper as viewed by the observer P is shown by a full line while the rubbing direction $A_2$ on the lower substrate 3 is shown by a broken line. The angles of the upper and lower rubbing directions from the partition member 8 are represented by $\beta 1$ and $\beta 2$, respectively. The values of these angles $\beta 1$ and $\beta 2$ would generally be equal to each other but may be different from each other depending on the material of the alignment coating, etc. Four independent combinations shown in FIGS. 14(b), (c), (d) and (e) can be made depending on in which direction the lower substrate 3 is rotated as viewed from the upper substrate 2 before being bonded. These combinations are distinguished by $\beta_3>0$, $\beta_3<0$, $180°-\beta_3>0$ and $\beta_3-180°<0$ wherein $\beta_3$ represents the cross angle of the rubbing direction $A_1$ on the upper substrate 2 and the rubbing direction $A_2$ on the lower substrate 3. In the present invention, the parallel rubbing and the antiparallel rubbing respectively satisfy the following relationships:

$$|\beta_3| \leq 90° \text{ and } |\beta_3| > 90°,$$

wherein $|\beta_3|$ represents the absolute value of the above cross angle.

As described in connection with FIG. 3, the rubbing direction A and the layer normal $L_1$, $L_2$ of the liquid crystal molecular layers often do not agree with each other but rather deviate from each other especially with respect to the antiferroelectric liquid crystal. The above mutual crossing of the pair of upper and lower rubbing directions is conducted for causing the pair of upper and lower layer normal directions not to cross each other, namely, to agree with each other in parallel relationship even when the rubbing direction and the layer normal of the liquid crystal molecular layers deviate from each other. The thus effected mutual agreement of the pair of upper and lower layer normal directions enables prevention of the occurrence of, for example, twist and irregularity of the liquid crystal molecular layers between the two substrates, so that the occurrence of miscellaneous defects different from zigzag defects and quasi-linear defects can be prevented.

It is difficult to estimate the cross angle of rubbing direction which enables prevention of the above miscellaneous defects. Thus, a liquid crystal panel having rubbing effected only on the substrate on one side was prepared and the angle β of deviation of the layer normal of the liquid crystal molecular layers was first estimated. Subsequently, a plurality of liquid crystal panels having respective cross angles close to about twice the angle β were prepared and the occurrence of defects was inspected. In this experiment, use was made of the following five types of antiferroelectric liquid crystals:

(1) single liquid crystal represented by the formula:

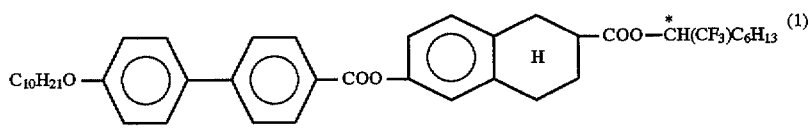

(2) single liquid crystal represented by the formula:

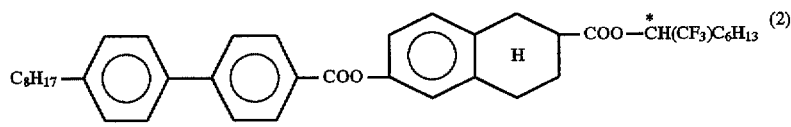

(3) single liquid crystal represented by the formula:

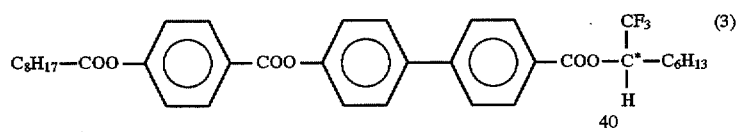

(4) mixed liquid crystal "MLC0049" produced by Mitsui Petrochemical Industries, Ltd. and (5) mixed liquid crystal "MLC0057" produced by Mitsui Petrochemical Industries, Ltd. The phase transition sequence and transition temperatures of each of these antiferroelectric liquid crystals are as given in Table 1.

TABLE 1

| Liquid crystal | Phase Transition Sequence and Transition Temperature (°C.) | | | | |
|---|---|---|---|---|---|
|  | K | $SmC_A^*$ | SmC* | SmA | Iso |
| (1) | 21 | 96 | 99 |  | 132 |
| (2) | 30 | 56 | — |  | 107 |
| (3) | 38 | 72 | — |  | 102 |
| (4) | <−30 | 72 | — |  | 99 |
| (5) | <−30 | 80 | — |  | 103 |

All the liquid crystals have antiferroelectric $SmC_A^*$ phases at low temperatures including room temperature. However, the chiral smectic phase first precipitated from the SmA phase is SmC* phase in the liquid crystal (1) and $SmC_A^*$ phase in the other liquid crystals. It was confirmed by X-ray diffractometry that the liquid crystals (3) and (4) had chevron structures, and the $SmC_A^*$ phase bending angle δ (see FIG. 8) was 20° in all the liquid crystals.

Each of the above antiferroelectric liquid crystals was infiltrated into the liquid crystal panel frame in a vacuum oven whose temperature was set so as for the liquid crystal to exhibit liquid phase (Iso) according to the customary procedure, gradually cooled and subjected to inspection of the state of alignment of the $SmC_A^*$ phase in the liquid crystal panel frame. Table 2 lists the average deviation angle β of the layer normal direction from the rubbing direction with respect to the rubbing made only on one side and the cross angle $β_c$ optimum for eliminating the miscellaneous defects.

TABLE 2

| Optimum Cross Angle $β_c$ and Deviation Angle β (deg.) | | |
|---|---|---|
| Liquid crystal | $β_c$ | β |
| (1) | −15 | −9 |
| (2) | −5 | −7 |
| (3) | −7 | −3 |
| (4) | −5 | −1.3 |
| (5) | −5 | −8.2 |

In this experiment, as long as the liquid crystal was cooled in the oven, the same results were obtained irrespective of any changes to the other conditions. Large and small zigzag defects were observed at the optimum cross angles of Table 2. These results were not changed irrespective of the resetting of the uniaxial alignment treatment to the parallel rubbing of the same cross angle. The reason was considered to be that the unit of the antiferroelectric liquid crystal consisted of the dimer of the ">" type having two molecules combined with each other along the layer normal thereof. However, in the parallel rubbing, some quasi-linear defects were observed in addition to the zigzag defects.

As apparent from Table 2, the cross angles βc at which zigzag defects were visualized were each roughly not greater than 20° although these were largely varied depending on the type of the liquid crystal. Both of the $\beta c$ and $\beta$ would possibly depend on the material of the alignment coating. However, these agreed with each other within ±2° when the alignment coating was composed of "SP 610" produced by Nissan Chemical Industries, Ltd. The $\beta c$ was different from twice $\beta$ and no clear correlation was recognized therebetween.

In the AF state (see FIG. 1(c)), the extinction direction thereof, i.e., the direction of layer normal was clear and was present nearly at the center of $\beta c$. Microscopic observation showed that the change to the direction of bending of the liquid crystal molecular layer, in other words, the occurrence of zigzag defects was found in the SmC* phase in the use of the liquid crystal (1) and was found in the SmC$_A$* phase in the use of the other liquid crystals.

In this Example, a tunnel kiln was used as a high temperature maintaining apparatus by which the liquid crystal panel was provided with a temperature gradient and cooled. On the lower temperature side, use was made of room temperature air. In this tunnel kiln, a pair of plane heaters were disposed so as to face each other at a spacing of about 6 mm and the periphery thereof except a narrow opening for use as an inlet and outlet of a liquid crystal panel was covered with a heat insulating material. This tunnel kiln was provided with a temperature control element for controlling the temperature of the kiln and a speed control element for controlling the speed of travel of the liquid crystal panel. The liquid crystal panel was inserted through the opening of the kiln and held in the kiln until the liquid crystal was heated to a liquid phase exhibiting temperature. Then, the liquid crystal panel was lifted into the air at a speed of about 2 mm/min in the direction parallel to the partition member. As a result, the direction of bending of the liquid crystal molecular layer agreed with the direction of lifting of the liquid crystal panel, so that the C1/C2 state alignment completely free of zigzag defects was obtained. The same C1/C2 state alignment was obtained by lifting the liquid crystal panel upside down. The same alignment state was obtained as long as the lifting speed was not greater than 5 cm/min.

When the absolute transmission factor under cross Nicols of the liquid crystal panel frame prior to infiltration of the liquid crystal was set at 1, the absolute transmission factor obtained by conducting the cooling in an oven without any temperature gradient as in the prior art and the absolute transmission factor obtained by cooling under a temperature gradient according to the present invention were as listed in Table 3.

TABLE 3

| Liquid crystal | Absolute Transmission Factor (%) | |
|---|---|---|
| | Temperature gradient | |
| | None | Provided |
| (1) | 0.5 | 0.1 |
| (2) | 0.08 | 0.05 |
| (3) | 0.4 | 0.1 |
| (4) | 0.1 | 0.05 |
| (5) | 0.2 | 0.08 |

In Table 3, the difference in absolute transmission factor mainly depends on the presence or absence of zigzag defects. Nevertheless, that, when there is the temperature gradient, as a whole, the alignment is superior also contributes to the difference.

Example 2

A liquid crystal panel frame was produced in the same manner as in Example 1, and the liquid crystal (2), i.e., single liquid crystal represented by the formula:

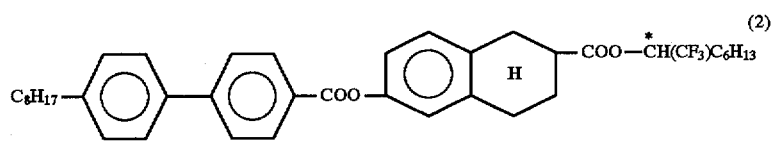

was infiltrated into the liquid crystal panel frame. Parallel rubbing, i.e., rubbing in which paired upper and lower rubbing directions were identical with each other and parallel to each other was carried out as uniaxial alignment treatment and, especially, the cross angle of the paired upper and lower rubbing directions was about −5°. This liquid crystal panel was lifted in the direction parallel to the partition member. As a result, the C1 alignment state also free of zigzag defects was obtained. Further, the C2 alignment state free from defects was obtained by exchanging the upper and lower ends of the liquid crystal panel and lifting the same in the reverse direction.

Comparative Example 1

A liquid crystal panel was produced in the same manner as in Example 1 except that the direction of extension of the partition members was set so as to deviate by an angle of $\epsilon$ from the center of the cross angle of the paired upper and lower rubbing directions. Thus, $\beta_1 = -15 + \epsilon$ and $\beta_2 = -\epsilon$. Three liquid crystal panel frames were produced by employing about 8°, about 6° and about 3° as $\epsilon$. The liquid crystal (1), i.e., single liquid crystal represented by the formula:

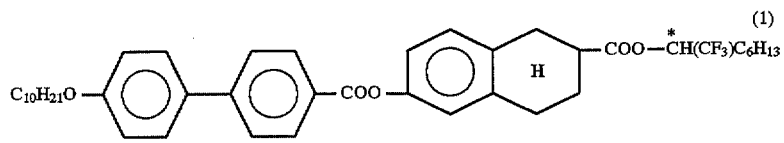

was infiltrated into the above liquid crystal panel frames. The liquid crystal panels were cooled with the temperature gradient provided in the same manner as in Example 1.

In each of the thus obtained structures as well, the layer normal direction of the liquid crystal molecular layers was nearly at the center of the cross angle of the paired upper and lower rubbing directions. However, strings which were different from defects ran nearly along the layer normal, so that the alignment form appeared clearly different from that of the Example. In the event of ε=about 8°, there were zones where focal conics having a size of about 10 μm were recognized in the vicinity of the partition members although the number thereof was extremely small. Therefore, it is not desirable that the layer normal direction of the liquid crystal molecular layers deviate as much as 10° or more from the partition members.

What is claimed is:

1. A liquid crystal panel comprising:

a pair of substrates at least one of which is transparent;

a pair of electrodes respectively formed on the substrates so as to face each other;

a plurality of linear partition members interposed between the substrates and arranged in parallel at predetermined intervals; and alignment coatings respectively formed on said pair of electrodes and provided with uniaxial alignment treatments;

said uniaxial alignment treatments being effected in anti-parallel directions at a cross angle of 15° to 30°, each of the partition members extending in a direction falling within said cross angle, the partition members being positioned between said substrates to thereby form linear interstices held in the state of being sealed against the liquid crystal in parts other than an opening for passage of the liquid crystal; and an antiferroelectric liquid crystal sealed within each of the linear interstices.

2. The liquid crystal panel as claimed in claim 1, wherein:

the pair of electrodes are composed of a pair of striped electrodes facing each other, each of which has been formed by arranging a plurality of electrodes at predetermined pitches;

said pair of striped electrodes cross each other at right angles; and each of the partition members linearly extends between electrodes of the striped electrode formed on one of the substrates at the same pitches as those of the striped electrode or a plurality of such pitches.

3. The liquid crystal panel as claimed in claim 1, wherein the pair of electrodes are composed of plane electrodes.

4. The liquid crystal panel as claimed in claim 1, wherein the antiferroelectric liquid crystal is in the state of a chiral smectic phase selected from the group consisting of chiral smectic $C_A$, chiral smectic $C\alpha$, chiral smectic $C\beta$ and chiral smectic $C\gamma$ phases.

5. The liquid crystal panel as claimed in claim 4, wherein the chiral smectic phase has a direction of layer normal which is parallel or substantially parallel to the direction of the extension of the partition members.

6. The liquid crystal panel as claimed in claim 4, wherein the chiral smectic phase has a direction of layer bending which is identical or substantially identical to that of a chiral smectic phase first precipitated from a smectic A phase.

7. The liquid crystal panel as claimed in claim 4, wherein the chiral smectic phase has a direction of layer inclination which is identical or substantially identical to that of a chiral smectic phase first precipitated from a smectic A phase.

8. A process for producing the liquid crystal panel as claimed in claim 1, which comprises the steps of:

cooling a liquid crystal panel frame in the state of having a temperature gradient formed and held in relation to the direction of extension of the partition members while proceeding from one end of the linear interstices having the antiferroelectric liquid crystal sealed therein to the other end of the linear interstices so that the antiferroelectric liquid crystal is cooled from a temperature at which the antiferroelectric liquid crystal exhibits a liquid or smectic A phase to a temperature at which the antiferroelectric liquid crystal exhibits a chiral smectic phase.

* * * * *